Fig. 1.

INVENTORS.
CLYDE H.O. BERG
RAOUL P. VAELL
JOHN H. BALLARD
AGENT.

[Begin patent document]

United States Patent Office 2,809,922
Patented Oct. 15, 1957

2,809,922

CATALYTIC CONVERSION PROCESS AND APPARATUS WITH IMPROVED TEMPERATURE CONTROL OF THE REACTION

Clyde H. O. Berg, Long Beach, and Raoul P. Vaell and John H. Ballard, Los Angeles, Calif., assignors to Union Oil Company of California, Los Angeles, Calif., a corporation of California Application March 21, 1952, Serial No. 277,832

19 Claims. (Cl. 196—50)

This invention relates to the catalytic conversion of hydrocarbons and in particular relates to the upgrading of petroleum naphthas under controlled temperature conditions to produce high quality, high anti-knock gasolines, or gasoline blending stocks. Specifically this invention relates to an improved continuous moving catalyst bed process for the catalytic reforming of petroleum naphthas, boiling roughly in the gasoline hydrocarbon boiling range, in which paraffin hydrocarbons are cyclized, olefin hydrocarbons if present are hydrogenated, naphthene hydrocarbons are dehydrogenated, and wherein aromatic hydrocarbons are synthesized while simultaneously desulfurizing and denitrogenating hydrocarbon compounds of sulfur and nitrogen in the presence of a catalyst, preferably cobalt molybdate, and a recycle gas containing hydrogen to produce an aromatic high knock rating gasoline stock of reduced nitrogen and sulfur content, and in which processes unique steps are effected to control the reforming temperature.

Conventional catalytic reforming treats low knock rating naphthas at temperatures of the order of 900 to 1000° F. in the presence of static beds of molybdenum oxide catalyst in a plurality of intermittently operated reaction zones to produce an aromatic product. The catalyst in the reaction zones is contacted with the feed naphtha vapors until partial deactivation of the catalyst occurs and then the catalyst is regenerated while the naphtha passes through one or more of the other reaction zones.

The numerous disadvantages of such a process include the complex equipment which requires a plurality of from 3 to 8 separate catalyst cases and the unusually complex system of automatically operated and interlocked control valves tied into a predetermined time cycle, etc. In addition, the molybdenum oxide catalyst is susceptible to deactivation or poisoning by the presence of hydrocarbon compounds of nitrogen and sulfur and the product is contaminated with such compounds. A considerable temperature drop exists across the catalyst bed due to the net endothermic nature of the aromatization reactions taking place. This temperature drop is particularly detrimental since the aromatization rate rapidly decreases and the yield of desired aromatic hydrocarbons is decreased at the lower temperatures.

Other disadvantages which adversely limit the length of permissible operation are due to the temperature changes generated in the catalyst bed between cycles of reaction and regeneration. In a static catalyst bed, such temperature changes are conducive to mechanical catalyst degradation due to the thermal expansion and contraction forces generated in each reaction and regeneration cycle.

The present invention is directed to improved naphtha reforming processes in which the aforementioned disadvantages have been eliminated through provision of a moving catalyst bed recirculated between a catalyst regeneration zone and a hydrocarbon conversion zone by a unique conveyance and sealing system, in which a catalyst is employed having desulfurization, denitrogenation and aromatization activity, and in which the usual endothermic temperature drop associated with aromatization reactions is substituted with an isothermal temperature gradient or an ascending temperature gradient by novel means for heating the vapor during the contact with the catalyst.

It is therefore a primary object of this invention to provide an improved hydrocarbon conversion process for the conversion of low-grade hydrocarbons in the presence of a bed of solid contact material in which undesirable temperature changes normally occurring are compensated for during the hydrocarbon-solids contact.

It is an additional object of this invention to provide a process for the production of aromatic hydrocarbons including benzene, toluene, and xylenes and their substituted homologues from low-grade naphthas containing paraffin, naphthene, and olefin hydrocarbons by an improved temperature controlled catalytic reforming process.

It is a more specific object to provide an improved process for the catalytic upgrading of low knock rating sulfur- and nitrogen-contaminated naphthas wherein a catalytic desulfurization and denitrogenation takes place in the presence of naphthene dehydrogenation, olefin hydrogenation, and paraffin cyclization to produce an aromatic and substantially saturated high knock rating product of reduced sulfur and nitrogen content in the presence of a catalyst containing cobalt molybdate or a mixture of cobalt oxide and molybdenum oxide and in the presence of a hydrogen-containing recycle gas.

Another object is to provide a catalytic hydrocarbon conversion process in which a plurality of conversion zones is provided in which temperature changes in the reactants take place and between which conversion zones heating or cooling of reactants is effected to compensate at least partially for these temperature changes.

An additional object is to provide in the processes defined above, a substantially isothermal temperature profile or a rising temperature gradient within the reaction zone established by novel methods of heating and cooling the reacting stream of vapor whereby greatly increased yields of aromatic hydrocarbons are obtained.

A further object is to provide, in combination with the process above, a specific hydrogen-containing recycle gas enriching step to produce a hydrogen-rich recycle gas without the use of extensive absorption, stripping, and distillation steps previously required.

A particular object of this invention is to provide a high pressure catalytic reforming process having a moving bed catalyst conveyed through conveyance zones between the reaction and regeneration zones in substantially compact form without the use of moving mechanical equipment and which effectively seals these zones from one another and prevents mixing of the fluids contacting the catalyst in each zone.

It is an additional invention to provide an improved apparatus to effect the aforementioned objects.

Other objects and advantages of the present invention will become apparent to those skilled in the art as the description thereof proceeds.

Briefly, the present invention comprises a continuous high pressure hydrocarbon conversion process for the upgrading of low-grade hydrocarbon fractions into aromatic high quality hydrocarbon products of reduced sulfur and nitrogen content by the specific reactions including olefin hydrogenation, hydrocarbon cyclization, naphthene dehydrogenation, hydrocracking, hydrocarbon desulfurization, and denitrogenation. The specific catalyst which is employed is cobalt molybdate or an adsorptive carrier impregnated with cobalt oxide and molybdenum oxide as prepared according to the steps given below. A recycle gas containing hydrogen is recirculated with the hydrocarbon vapor through the reaction zone. By means of reactor interheater zones disposed along the length of the reactor and operating in conjunction with a simplified reactor internal structure, the vapor and hydrogen mixture is removed at intervals from the reaction zone, passed through a reactor interheater zone, and returned to the reactor for further hydrocarbon conversion in the presence of the catalyst. By adjusting the degree to which the reacting fluid is reheated in the interheater zones, the normal endothermic aromatization reaction temperature drop may be partly or completely compensated for, in which case an isothermal temperature gradient results, or an over compensation may be made to establish a highly advantageous increasing temperature gradient in the reactor.

By maintaining isothermal or increasing temperature gradient conditions in this manner, a substantially increased degree of aromatic hydrocarbon production is obtained. Particularly is this true in the rising temperature gradient operation because as the aromatic hydrocarbons are formed in the hydrocarbon vapor passing through the reactor, the vapor becomes more refractory and of increased thermal stability and the increased temperatures are conducive to increased aromatic hydrocarbon production rates without danger of thermal decomposition taking place.

The reaction conditions which are preferred in this process and which are detailed below favor aromatization and hydrocracking reactions. The latter reaction, being one in which a hydrocarbon is cracked in the presence of hydrogen, successfully achieves a moderate boiling range reduction in which the hydrocracking reaction products are essentially hydrocarbons which are normally liquid and boil in the lower gasoline range. Thus, greatly reduced quantities of normally gaseous hydrocarbon products such as hydrogen, methane, $C_2$ to $C_4$ saturated and unsaturated hydrocarbons, and coke are formed in distinction to the conventional catalytic or thermal cracking processes. The hydrocracking reactions are effected simultaneously with the dehydrogenation and aromatization reactions resulting in a maximum liquid yield of aromatic hydrocarbon-containing products and which products constitute an excellent high quality gasoline blending stock, aromatic solvent, or source stock for pure aromatic hydrocarbons.

The granular catalyst passes downwardly as a substantially compact unfluidized moving bed through the regeneration zone and the reaction zone. The moving bed in each of these zones flows by gravity and has a bulk density in pounds of catalyst per cubic foot of occupied volume which is substantially the same as the bulk or apparent density of the granular catalyst when at rest and in the absence of moving fluids.

The granular catalyst is recirculated between the reaction and regeneration zones also as a moving, compact unfluidized bed of solids through conveyance conduits in the presence of a concurrently depressuring conveyance fluid. During conveyance the granular solids are maintained in a substantially compact unfluidized condition of bulk or apparent density which is substantially the same as the bulk density of the granular catalyst flowing in the reaction and regeneration zones.

This unusual type of solids conveyance is obtained by providing an induction chamber into which the granular solids discharge from either or both of the reaction and regeneration zones and by providing a conveyance conduit opening into the chamber so that its inlet opening is submerged by the granular solids. The outlet of the conveyance conduit is provided with means for restricting the discharge of solids therefrom without effecting any substantial restriction to the discharge of the conveyance fluid which depressures concurrently with the granular solids from the induction chamber through the conveyance conduit. The pressure gradient existing along the length of such a conveyance conduit is substantial and exceeds by many times the pressure drop characteristic of the conventional pneumatic solids conveyance in which fluidized or suspended solids are transferred. Thus the conveyance fluid flowing through the compact unfluidized solids being conveyed effectively seals the reactor from the regenerator without the use of the undesirable long sealing legs conventionally required and a considerable reduction in the height of the apparatus structure is achieved.

To secure movement of the solids it is necessary to establish and maintain a conveyance force ratio, defined below, which exceeds a value of 1.0 throughout the length of the conveyance zone. The conveyance force ratio is defined as:

$$\frac{\frac{dp}{dl}}{\rho_s \cos \theta}$$

wherein $dp/dl$ is the pressure gradient in pounds per square foot per foot of conveyance zone length, $\rho_s$ is the apparent bulk density of the compact unfluidized granular solids in pounds per cubic foot, and $\theta$ is the angle of inclination of the conveyance conduit measured from a vertical axis. A conveyance fluid is passed through the conveyance zone which is filled with a moving compact unfluidized permeable mass of granular solids. This fluid flow, through the tortuous flow paths comprising the connecting interstices between the granular solids, generates a substantial pressure drop in the direction of flow which establishes a conveyance force on each individual granular solid in the same direction. When the conveyance force ratio of 1.0 is exceeded, the entire compact mass moves in the direction of conveyance fluid flow. Circulation rates of the order of 20,000 to 30,000 pounds of catalyst per hour may be easily attained in conveyance conduits 4 to 6 inches in diameter. The magnitude of the pressure drop and the use of an inert conveyance fluid such as steam, or flue gas or the like permits effective sealing of the regeneration zone from the reaction zone in addition to solids transfer. The conveyance is effected in the total absence of moving mechanical devices thus eliminating a difficult maintenance problem and permitting solids conveyance at substantial superatmospheric pressures of as high as 1,000 to 1,500 pounds per square inch or higher. Such a moving bed high pressure catalytic conversion process has not been heretofore available.

The reactor effluent is cooled and condensed and fractionated for the recovery of the desired gasoline range hydrocarbon product. The uncondensed gas phase is separated and subjected to a particular hydrogen enrichment absorption step to produce a recycle gas containing a high proportion of hydrogen. This recycle gas is heated and injected with the preheated naphtha reactor feed into the reaction zone.

The process of the present invention and the apparatus improved to effect it will be more closely understood by reference to the accompanying descriptions in which:

Figure 2 is a chart showing the variation in reaction zone temperature with distance from the reactor inlet under various conditions of operations as compared with the conventional molybdenum oxide reforming process, Figures 3 and 4 indicate an elevation and a plan view respectively of the sealing zone and reactor vapor disengaging and engaging tray by means of which the vapor is forced from the reaction zone through an interheater zone and back into the reaction zone, and Figure 5 indicates an elevation view in partial cross section of the detail of the conveyance zone disengaging head and the granular catalyst elutriation system by means of which catalyst fines are continuously separated at high pressure from the recirculating catalyst stream.

Figure 1:
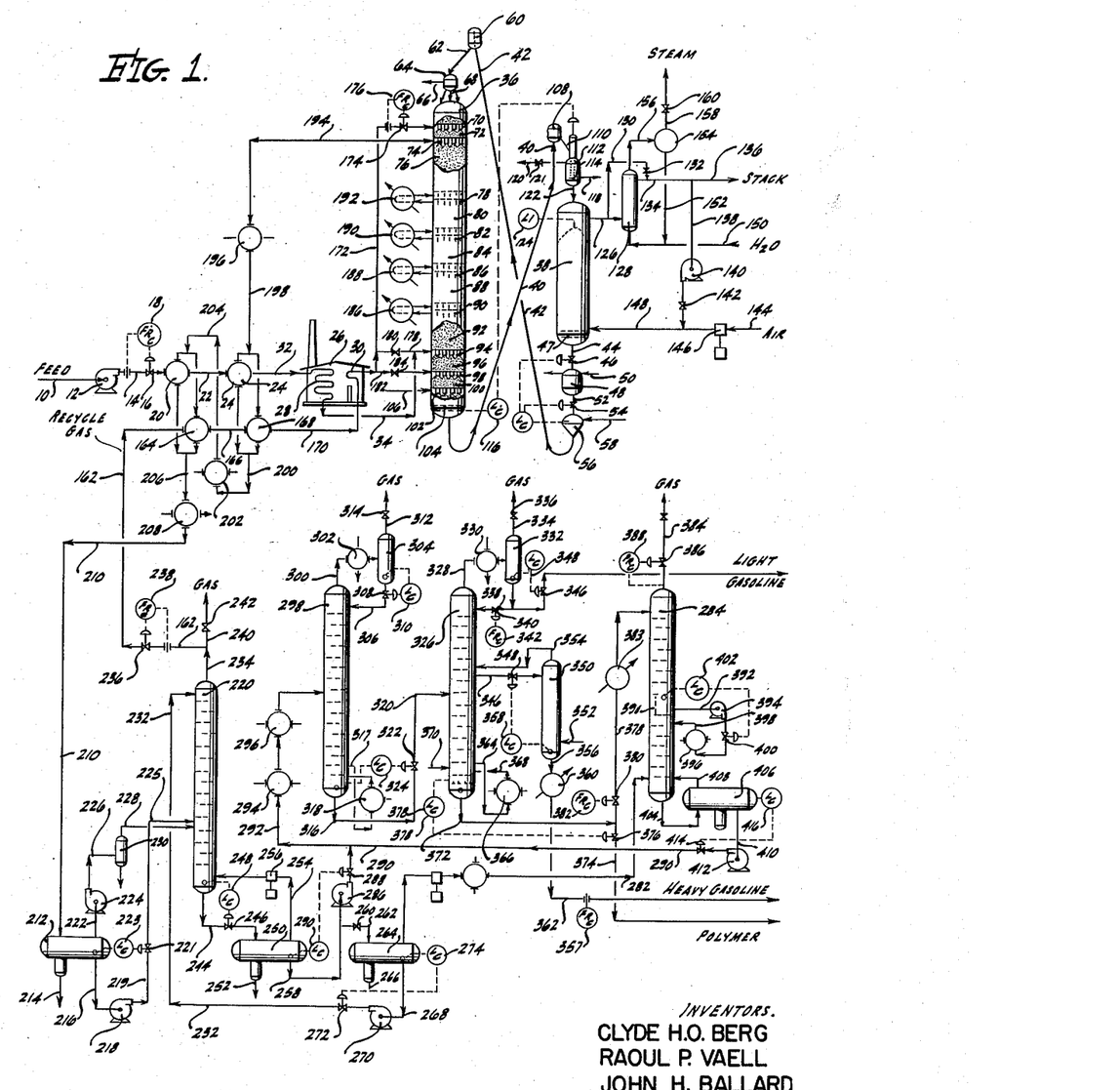
Figure 1 is a process flow sheet of this invention.

Referring now more particularly to Figure 1, a detailed illustration of the naphtha reforming process of the present invention is described including specific temperature, pressure, and other conditions of operation by way of an example.

Example 1

The naphtha feed consists of a mixture of 57% by volume of coker pressure distillate and 43% by volume of straight-run naphtha and has a boiling range of from 140° F. to 400° F. It has a gravity of 51.6° API. This feed stock analyzes 1.8% sulfur and 0.012% nitrogen by weight combined as hydrocarbon compounds of these elements. This naphtha comprises a relatively low-grade gasoline having a knock rating of 71.0 by the Research Method with 3 ml. of tetraethyl lead added.

In the illustrative operation 12,750 B./D. (barrels per day, 1 barrel=42 U. S. gallons) is introduced through line 10 by means of pump 12 and is passed through line 14 at a rate controlled by valve 16 in accordance with flow recorder controller 18. Pump 12 pressures the feed naphtha to 490 p. s. i. g. (pounds per square inch gauge) and it is passed through interchanger 20 wherein it is raised to a temperature of 300° F. in exchange with the reactor effluent subsequently described. The partially preheated naphtha then passes through line 22 into and through second interchanger 24 wherein it is heated to 475° F. A fired preheater 26 is provided with naphtha vaporizing coil 28 and recycle gas heating coil 30. The preheated naphtha passes from interchanger 24 through line 32 and is vaporized in coil 28. The vapor passes through line 34 and is injected into the reactor column as described subsequently.

The process employs a reactor column 36 and regeneration column 38. Cobalt molybdate catalyst, prepared as described below, is circulated at a rate of 19,600 pounds per hour between these two columns as a continuous compact unfluidized moving bed downwardly by gravity through columns 36 and 38 and upwardly by means of a concurrently depressuring conveyance fluid through conveyance conduits 40 and 42. Regenerated granular catalyst flows from the bottom of regeneration column 38 through line 44 at a rate controlled by catalyst solids feeder 47 discussed below, into pressuring chamber 48. Steam is introduced at a rate of 170 pounds per hour to raise the pressure of the gas phase therein from a value of 318 p. s. i. g. to a value of 575 p. s. i. g. The pressured solids then flow through line 52 controlled by valve 54 into regenerated catalyst induction zone 56. A conveyance and sealing fluid comprising 2,020 pounds per hour of steam is introduced through line 58. The steam depressures through regenerated catalyst conveyance zone 42 concurrently with the compact unfluidized mass of granular catalyst into restriction zone 60. A restrictive or thrust force is applied to the flow of granular solids discharging from conveyance conduit 42 thereby maintaining the solids during conveyance in substantially compact and unfluidized form at the same bulk or apparent density as the solids flowing in column 38. The regenerated catalyst and conveyance steam, which has depressured to 400 p. s. i. g., flows through transfer line 62 into separator zone 64. Part of the depressured conveyance steam is removed at a rate of 1,720 pounds per hour through line 66. The remainder of the steam passes as a seal gas concurrently with the regenerated catalyst from the bottom of separator zone 64 through a plurality of distributing conduits 68 which discharge the regenerated catalyst into the top of reaction vessel 36 uniformly throughout its cross sectional area.

In another preferred modification, not shown, part of the spent catalyst is depressured from the bottom of reactor column 36 through lift line 40 into the regeneration column as described above while the remaining part of the catalyst is passed from the bottom of column 36 into and through a pressuring zone and induction zone similar to zones 48 and 56 and returned through a spent catalyst recycle conveyance conduit to the top of column 36. Thus, only a part of the catalyst flow through the reaction zones is regenerated continuously.

The regenerated catalyst passes downwardly by gravity, in either modification, as a compact unfluidized moving bed through reactor column 36 successively through reduction gas engaging zone 70, catalyst reduction zone 72, reactor effluent disengaging zone 74, fifth reaction zone 76, fourth sealing and vapor disengaging-engaging zone 78, fourth reaction zone 80, third sealing and vapor disengaging-engaging zone 82, third reaction zone 84, second sealing and vapor disengaging-engaging zone 86, second reaction zone 88, first vapor sealing and disengaging-engaging zone 90, and first reaction zone 92. The granular catalyst continues through reactor feed engaging zone 94, recycle gas stripping zone 96, recycle gas engaging zone 98, catalyst stripping zone 100, and stripping gas engaging zone 102. Adjacent the bottom of column 36 is provided a reciprocating catalyst solids feeder 104 which fixes the granular solids circulation rate and maintains a uniform granular catalyst flow throughout the entire cross section of the reaction column.

The catalyst solids feeders 47 and 104 referred to above are shown in detail and claimed in U. S. Patent No. 2,544,214.

Although 5 separate reaction zones are shown here, the number may be varied from as few as 2 to as many as 10 or more depending upon how closely the temperature is to be controlled.

Steam is introduced at a rate of 3,060 pounds per hour through line 106 into stripping gas engaging zone 102. A substantial proportion of this steam passes downwardly concurrently with the spent catalyst which flows from the bottom of reactor column 36 into spent catalyst conveyance zone 40. This part of the steam constitutes the conveyance and sealing fluid for the spent catalyst and it depressures from 400 p. s. i. g. to 317 p. s. i. g. in passing concurrently with the compact unfluidized spent catalyst flowing through spent catalyst conveyance zone 40 into restriction zone 108. The depressured conveyance steam and the conveyed unfluidized spent catalyst flows by gravity through transfer line 110 into elutriation and lift gas disengaging zone 412, described and illustrated more clearly in Figure 5. Zone 112 contains spent catalyst flow control valve 114 which is actuated by level controller 116 in accordance with the solids level existing in the bottom of reactor column 36 below catalyst feeding device 104. Thus, device 104 controls the rate at which granular catalyst is circulated. Flow control valve 114 and level controller 116 maintain a solids level in the bottom of column 36 keeping the inlet of conveyance conduit 40, opening into the bottom of reactor column 36, submerged with a compact bed of spent catalyst. An elutriation gas is introduced into zone 114 countercurrent to solids flow by means of line 122 and a portion thereof is removed through line 118. Lift gas comprising steam passes from zone 112 via line 120 controlled by valve 121 and may be depressured through a turbine drive for regeneration air and other compressors not shown.

The elutriated spent catalyst passes through transfer line 122 into the top of regeneration vessel 38. Level indicator 124 is provided to indicate the catalyst inventory maintained in the system. The spent catalyst, containing an average of 5% by weight of heavy hydrocarbonaceous deposits, is countercurrently contacted with a mixture of flue gas and air introduced at a temperature of 700° F. and a pressure of 318.5 p. s. i. g. The deactivating deposit is burned forming a regenerated catalyst and flue gas. The flus gas at 317 p. s. i. g. and 1100° F. is removed from the top of regeneration column 38 at a rate of 43,765 MSCF./D. (1 MSCF./D.=1,000 standard cubic feet per day) through line 126 and is introduced in part through waste heat boiler 128 at a rate of 29,000 MSCF./D. and in part bypassed through line 130 at a rate of 12,780 MSCF./D. controlled by valve 132. Cooled flue gas is removed from waste heat boiler 128 at 500° F. and combined with bypassed flue gas at 1,100° F. to form a flue gas mixture having a temperature of 700° F. This mixture flows through line 134 and is again split into two streams. One stream passing through line 136 at a rate of 4,065 MSCF.%D. is depressured from 317 p. s. i g. through a turbine expansion drive for the centrifugal compressor for the hydrogen recycle gas. The remaining part of the 700° F. flue gas is passed through line 138 into flue gas recycle blower 140 at a rate of 39,700 MSCF./D. controlled by valve 142, is combined with 3,900 MSCF./D. of fresh air introduced through line 144, and is raised to a pressure of 320 pounds per square inch gauge in air compressor 146. The flue gas-air mixture is then passed through line 148 into the bottom of regeneration column 38.

Water is introduced through line 150 at a rate of 18.2 gallons per minute and is combined with unvaporized water flowing through line 152 from steam drum 154 into the bottom of waste heat boiler 128. Vapor from the boiler passes through line 156 into steam drum 154 and 400 p. s. i. g. steam is produced therefrom through line 158 at a rate of 9,100 pounds per hour controlled by valve 160. This steam is employed in the process for stripping the spent catalyst, etc. For conveyance of the spent and regenerated catalyst through conveyance conduits 40 and 42, a separate source of 600 p. s. i. g. steam, not shown, is provided.

Recycle gas containing 65% hydrogen flows at a rate of 39,640 MSCF./D. through line 162 and interchanger 164 wherein it is heated to a temperature of 300° F. in exchange with the reactor effluent. With straight-run feed stock, the hydrogen concentration is higher, on the order of 75–80%. The partially preheated recycle gas then passes through line 166 and second interchanger 168 wherein it is heated to a temperature of 475° F. in exchange with the reactor effluent. The additionally preheated recycle gas flows through line 170 and recycle gas heater coil 30 wherein the temperature is raised to 825° F. The heated recycle gas is then introduced into the reactor column.

One portion of the recycle gas flows through line 172 at a rate of 1,440 MSCF./D. controlled by valve 174 actuated by flow recorder controller 176 and is injected into reduction gas engaging zone 70 to reduce the oxidized regenerated catalyst chemically to a lower oxidation state in which it possesses its highest reforming, desulfurization, and denitrogenation activity. This reduction takes place during the concurrent passage of gas and catalyst through reduction zone 72. The reduction gases are removed with the reactor effluent from effluent disengaging zone 74.

A second portion of 825° F. recycle gas is either totally injected with the reactor feed through line 178, controlled by valve 180, or is separately injected through line 182 controlled by valve 184 at a rate of 38,200 MSCF./D. into recycle gas engaging zone 98 wherein hydrogen stripping of spent catalyst is effected. In some cases it is highly advantageous to inject part of the recycle gas with the reactor feed through line 178 and the remaining part separately introduced through line 182.

The mixture of hydrogen recycle and reactor feed vapor passes successively through first, second, third, fourth, and fifth reaction zones in column 36 countercurrent to a downwardly flowing compact bed of granular cobalt-molybdate reforming catalyst. In first reaction zone 92 an active olefin hydrogenation takes place, rapidly raising the temperature of the system from 825° F. to 900° F. At this elevated temperature a small amount of naphthene dehydrogenation begins to occur causing the temperature to drop from 900° F. to about 890° F. by the time vapor reaches first vapor disengaging and engaging zone 90. At this point the major portion of the vapor mixture is disengaged from zone 90 and passed through first interheater zone 186. Here the vapor is indirectly heated by flue gas to a temperature of 910° F. and the vapor returns to the upper engaging portion of zone 90 while a minor portion passes directly through the sealing zone into second reaction zone 88. The reheated vapor then passes with the unheated minor portion through second reaction zone 88 in which additional naphthene dehydrogenation and aromatization take place causing a decrease in temperature to about 890° F. Again the vapors are removed from the lower disengaging portion of vapor disengaging and engaging zone 86, passed through second interheater zone 188, and reintroduced at a temperature of about 910° F. into the upper engaging portion of zone 86. The reheated vapors pass successively in the same manner through third reaction zone 84, third interheater zone 190, fourth reaction zone 80, fourth interheater zone 192, and fifth reaction zone 76. The reactor effluent is removed from disengaging zone 74 and flows at a temperature of 890° F. and a pressure of 400 p. s. i. g. from the reaction column through line 194.

The four interheater zones each have 890 square feet of heat transfer area and employ a total flow of 32,200 MSCF./D. of 1,100° F. flue gas. A temperature controller, not shown is provided on each interheater to maintain the temperature of the reacting vapor returned to the subsequent reaction zone at a value of 910° F. or any other desired value.

The reactor effluent flows through line 194 through interchanger 196 wherein it is cooled to a temperature of 735° F. and supplies heat to the rerun and depropanizer column reboilers described subsequently. The partially cooled reactor effluent then passes through line 198 and is split into two streams, one each of which passes through interchanger 24 and interchanger 168 thereby further cooling the effluent and supplying heat to the reactor feed and the recycle gas respectively. The streams are subsequently combined in line 200 at a temperature of 570° F. The stream then flows through interchanger 202 cooling to 420° F. and supplying heat to the depropanizer feed described below. The 420° F. stream is again split into two streams, one of each passing through interchanger 20 and interchanger 164 to supply the initial preheat to the reactor feed and the recycle gas respectively. These streams are again combined at a temperature of 245° F. and flow through line 206 and effluent aftercooler 208 where the temperature is reduced to 110° F. In this manner a greater proportion of the heat supplied to the reaction zone is recovered in the process.

The cool reactor effluent then passes through line 210 at a pressure of 370 p. s. i. g. into dropout drum 212. A liquid level is maintained herein and water is drawn off at a rate of 2,380 pounds per hour through line 214. This water comprises condensed steam injected into the reactor. The dewatered reactor effluent is drawn from drum 212 through line 216 and pumped by means of pump 218 at a rate of 12,250 B./D. and a pressure of 456 p. s. i. g. into hydrogen enrichment absorption column 220. At this point the cooled effluent has a gravity of 62.3° API. This liquid flows through line 219 at a rate controlled by valve 221 in accordance with level controller 223 and on through line 225 into absorption column 220. The gas phase is drawn from drum 212 through line 222 by means of compressor 224 and raised to 450 p. s. i. g. This gas has a molecular weight of 11.1 and flows at a rate of 42,600 MSCF./D. through lines 226 and 228 through dropout drum 230 into column 220.

Hydrogen enrichment absorption column 220 operates 420 p. s. i. g., is 5 feet 9 inches in diameter and 63 feet high, and is provided with bubble cap trays. A stream of degassed reactor effluent, produced as hereinafter described, flows into the top of column 220 through line 232. This liquid passes downwardly countercurrent to a rising stream of hydrocarbon gas and hydrogen formed as described below. A substantial proportion of the hydrocarbon constituents are absorbed in the down flowing stream leaving an unabsorbed gas containing a high proportion of hydrogen. It is removed from column 220 through line 234. The recycle gas stream comprises a portion of this absorber overhead gas and it flows through line 162 at a rate of 39,640 MSCF./D. controlled by flow recorder controller 238. The reforming process is such that a small quantity of excess hydrogen-containing gas is continuously produced which is bled from the system through line 240 at a rate of 113.5 MSCF./D. controlled by valve 242. The recycle gas is preheated and injected into the reaction column as described above.

The rich oil phase, containing absorbed gases, flows from the unheated bottom of hydrogen enrichment absorber 220 through line 244 at a rate controlled by valve 246 actuated by level controller 248. This cool rich liquid is depressured or flashed through valve 246 to a pressure 145 p. s. i. g. into first flash zone 250. Traces of water are removed through line 252 while the hydrogen-containing gas, released in the first flashing step, passes through line 254. It is repressured to 450 p. s. i. g. in compressor 256 and is injected at 260° F. into the bottom of the hydrogen enrichment absorption column. This gas passes upwardly through the column where the hydrocarbon constituents are largely absorbed thereby rectifying the oil phase to remove any absorbed hydrogen. The recycle gas referred to above is thus produced.

In conventional rectified oil absorption, the rich oil is heated to liberate absorbed gases in the bottom of the column. However, it has been found that greater quantities of absorbed hydrogen can be liberated from the rich absorption oil by the depressuring steps of this invention in the total absence of heating than with heated absorption oil. This is contrary to the usual rich oil stripping operations in which heating of the rich oil assists the liberation of the absorbed materials. Any liberated hydrocarbon gases are readily soluble in the lower or rectifying section of column 220 below the reactor effluent inlet at the low temperatures maintained there, while the hydrogen is of lower solubility than if the oil were hot and passes upward and becomes the hydrogen-rich recycle gas referred to above.

The liquid hydrocarbon stream is removed from first flash drum 250 through line 258 and is divided into two streams, one of which is depressured or flashed to a pressure of 15 p. s. i. g. through expansion valve 260 and flows through line 262 to second flash drum 264. Traces of water are withdrawn through line 266 and the liquid hydrocarbon, constituting a relatively gas free portion of the reactor effluent, is removed from drum 264 through line 268 at a rate of 21,600 B./D. It is repressured to 456 p. s. i. g. in pump 270 and passes through line 232 as the degassed reactor effluent stream employed as absorption oil in hydrogen enrichment absorption column 220 referred to above. The flow rate is controlled by valve 272 actuated by level controller 274.

The gas phase formed in second flash drum 264 is removed through line 276 at a rate of 2,420 MSCF./D., having a molecular weight of 33.5, and is pressured to 180 p. s. i. g. in compressor 278. This gas is cooled in cooler 280 and is introduced through line 282 into the bottom of make gas absorption column 284, the operation of which is described subsequently.

As referred to briefly before the remaining portion of the degassed reactor effluent, removed from first flash drum 250 is pressured to 322 p. s. i. g. in pump 286 and flows at a rate of 12,500 B./D. controlled by valve 288 actuated by level controller 290. This stream has an API gravity of 61.6°. It is combined with 1,800 B./D. of rich make gas absorption oil flowing through line 290 and is passed through line 292 through interchanger 294 wherein it is heated to a temperature of 148° F. in exchange with rerun column bottoms and is further preheated in interchanger 296 to a temperature of 375° F. in exchange with the reactor effluent. Actually interchangers 202 and 296 are the same. The preheated stream flows at 14,300 B./D. at 375° F. and having a gravity of 57° API into depropanizer column 298. Depropanizer column 298 operates at 285 p. s. i. g., has a bottoms temperature of 500° F., and an overhead temperature of 125° F. The column is 6 feet 6 inches in diameter and 83 feet 6 inches high and provided with bubble cap trays.

The overhead vapor from depropanizer column 298 passes through line 300 and condenser 302 and subsequently into reflux accumulator 304. The condensate is pumped by means not shown through line 306 as reflux at a rate of 9,450 B./D. controlled by valve 308 and level controller 310. The uncondensed fraction, having a molecular weight of 32.3, is removed from drum 304 through line 312 at a rate of 1,970 MSCF./D. controlled by valve 314.

The depropanizer bottoms stream has an API gravity of 52.5°. A portion of the bottoms stream is pumped through line 317 and is reboiled in reboiler 318 in exchange with the reactor effluent flowing through interchanger 196. The vapor is injected into the bottom of the depropanizer column 298. The net bottoms stream flows at 13,350 B./D. through lines 316 and 320 controlled by valve 322 actuated by level controller 324 and passes into gasoline rerun column 326.

The gasoline rerun column operates at 6 p. s. i. g. and has an overhead temperature of 273° F. and a bottoms temperature of 480° F. The column is 9 feet 3 inches in diameter and 61 feet high. The feed to the rerun column is introduced at 340° F. The column is provided with bubble cap trays.

The overhead vapor passes through line 328 and condenser 330 into reflux accumulator 332. Any uncondensed gas is removed therefrom through line 334 controlled by back pressure regulator 336. The condensate is pumped in part, by means not shown, at 4,250 B./D. through line 338 controlled by valve 340 actuated by flow recorder controller 342 as reflux. The remaining part of the condensate is removed through line 344 at a rate of 10,550 B./D. controlled by valve 346 in accordance with level controller 348.

This is the light gasoline product of the process. It has an API gravity of 61.6°, has an unleaded knock rating of 84 and with 3 ml. of tetraethyl lead added, the knock rating is 95 by the Research Method. This light gasoline has a boiling range of 102° F. to 339° F. and contains 0.02% sulfur and 0.001% nitrogen by weight. It contains 40% aromatic and 1% olefin hydrocarbons by volume.

A side stream is removed from gasoline rerun column 326 through line 346 at a rate controlled by valve 348 and is pumped into heavy gasoline side stripper 350. This column is 2 feet in diameter and 25 feet high and is also provided with means for effectively contacting the vapor and liquid. Stripping steam is introduced through line 352 at a rate of 391 pounds per hour into the bottom of the heavy gasoline stripper. The light gasoline is stripped from the heavier components and the vapor is returned to rerun column 326 through line 354. The stripped heavy gasoline is removed from the bottom of the heavy gasoline stripper through line 356 at a rate determined by flow recorder controller 357 which indirectly actuates level controller 358. It passes through aftercooler 360 and flows to production through line 362. The heavy gasoline production rate is 1,120 B./D. and it has an API gravity of 43.1°. This heavy gasoline has a boiling range of 320° F. to 420° F. and contains 0.03% sulfur and 0.002% nitrogen by weight. It contains 80% aromatic and 1% olefin hydrocarbons by volume.

The bottom of the rerun column is heated by withdrawing a stream of liquid from the column near the bottom through line 364, pumping it through interchanger 366 in exchange with the hot reactor effluent (interchanger 196), and the vapor formed is returned to the bottom of the rerun column through line 368. Steam for stripping is introduced through line 370 at a rate of 880 pounds per hour.

The rerun column bottoms product is removed through line 372 and is split into two streams, one of which is removed from the process through line 374 at a rate controlled by valve 376 actuated by level controller 378. This stream comprises residual oil having a gravity of 16° API and is removed from the process as a product at a rate of 387 B./D.

The remaining portion of the rerun column bottoms is passed through line 378 at a rate controlled by valve 380 and flow recorder controller 382, and then through cooler 383 into the top of make gas absorption column 284. This stream flows at a rate of 1,345 B./D. and constitutes an absorption oil to recover gasoline range hydrocarbons from the gas obtained upon the two-stage flashing of the reactor effluent described above. Make gas absorber 284 operates at 175 p. s. i. g. and is 2 feet in diameter and 83 feet 6 inches high. It is provided with bubble cap contacting trays. The unabsorbed hydrocarbon gas is removed from the top of the column through line 384 at a rate controlled by valve 386 and pressure recorder controller 388. This gas has a molecular weight of 26, consists principally of methane and ethane, and is produced at a rate of 1,780 MSCF./D.

A drawoff tray 390 is provided from which a portion of the absorption oil passes through line 392 by means of pump 394 through cooler 396 and is returned to a somewhat lower point through line 398. The temperature is reduced from 127° F. to 100° F. and the flow rate is controlled by valve 400 and level controller 402.

At the bottom of column 284 are introduced the gases removed from second flash drum 264. These pass upwardly counter-current to the descending absorption oil to produce the methane and ethane gas referred to. The rich absorption oil is passed through line 404 into drum 406 where any vapor is disengaged and returned through line 408 to the bottom of the make gas absorber.

The rich oil is removed from drum 406 through line 410 at a rate of 1,800 B./D. charged with absorbed gasoline range hydrocarbons. The gravity is 32° API. This stream is pumped by means of pump 412 through line 290 at a rate controlled by valve 414 and level controller 416 for combination with a portion of the liquid hydrocarbon removed from first flash zone 250 to form the depropanizer column feed.

From the foregoing description, which comprises a specific example of low-grade petroleum naphtha upgrading by means of isothermal catalytic reforming according to this invention, it is seen that the process produces an 83% volumetric yield of light gasoline in which the knock rating is increased by 24 points. This yield is a great increase relative to the usual light gasoline yields ordinarily obtained. Whereas the feed naphtha analyzes 1.80% sulfur and 0.012% nitrogen by weight, the light gasoline product analyzes only 0.02% and 0.001% by weight of sulfur and nitrogen respectively. The greatly increased knock rating is directly attributable to the maintenance of substantially isothermal reaction conditions and the active catalytic denitrogenation and desulfurization which take place simultaneously with the reforming and aromatization.

In another desirable modification of the temperature controlled catalytic reaction system and which is highly desirable for reactions in which catalyst coking is not excessive, as in straight-run naphtha reforming, the compact unfluidized catalyst conveyance and sealing system may be employed to regenerate the catalyst simultaneously during conveyance thus eliminating the separate regeneration vessel shown in Figure 1. In this modification, a plurality of parallel lift line conduits are employed opening from an induction chamber into which the spent catalyst is pressured from a pressuring vessel as shown at the bottom of the regenerator column. An inlet is also provided for steam and/or flue gas and air into the induction chamber. The conduits parallel the reaction column and at the top thereof discharge regenerated solids and flue gas into a regeneration gas separator where a thrust force is applied to the discharging solids to keep them compact and unfluidized during the conveyance and regeneration and at the same bulk density as catalyst flowing in the reaction zones. Flue gas is removed from the separator and regenerated solids flow into the top of the regenerator column. In other respects the reactor column is as shown in Figure 1. The parallel lift conduits constituting the regenerator are surrounded by a stack open at the open for venting of heated air and provided with an inlet for cool atmospheric air for cooling the lift conduits to dissipate the exothermic heat of regeneration. Natural convection or forced air cooling may be used. A 36-inch diameter stack and 32 3-inch nominal pipe size lift conduits provide a 500-pound per hour coke burning capacity in the reforming process of this invention. The lower inlet openings of the lift lines are provided with a 2-inch diameter opening disposed adjacent and above a cone-shaped baffle within the induction chamber and onto which baffle a layer of spent catalyst is discharged submerging the lift conduit inlets.

Figures 2, 3, 4, 5:
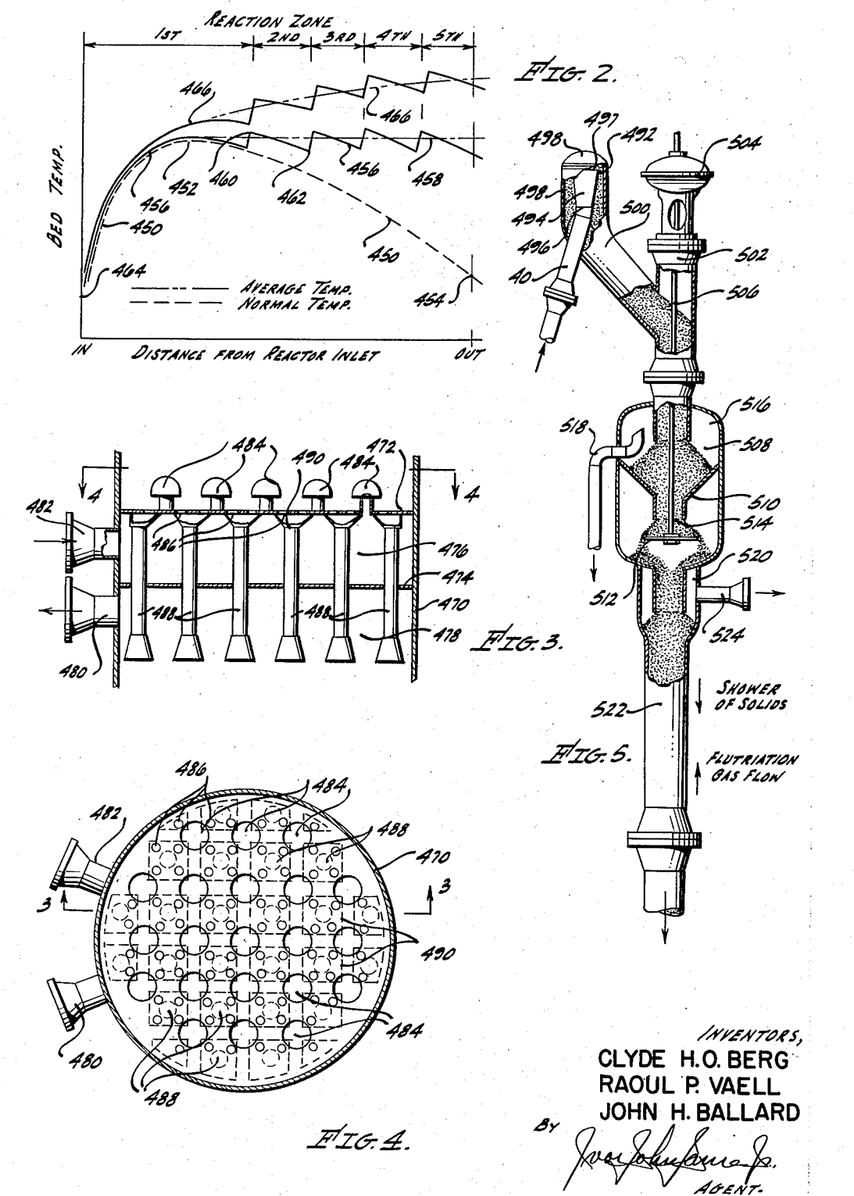

Referring now to Figure 2, temperature profiles or gradients are illustrated for various types of operation and in which the reaction zone temperature is plotted with respect to the distance from the reactor inlet.

Curve 450 represents the conventional adiabatic reforming operation temperature conditions in which an olefin-containing feed stock is treated in the presence of hydrogen and reforming catalyst. The initially rapid temperature rise is caused by the exothermic heat liberated in olefin hydrogenation whereas the downward progressing temperatures to the downstream side of the peak temperature at point 452 are caused by the endothermic aromatization reactions which proceed fairly rapidly at the elevated temperature attained following the olefin hydrogenation. It is obvious that because of the wide temperature variation, either thermal degradation will take place in the region of the peak temperature designated generally by 452 or else the aromatization reaction rates will be quite low in the low temperature part of the curve. The magnitude of the difference between the peak temperature and the outlet temperature indicated at 454 may be of the order of 100° F. to 150° F. causing a wide variation in reaction rate and reaction equilibrium.

Also shown in Figure 2 is curve 456 which may include the same initial temperature rise due to olefin hydrogenation as curve 450 to the left of peak temperature 452 when olefin-containing naphthas are used, but in which the endothermic temperature drop normally occurring to the right hand or downstream side of the temperature peak 452 is compensated for by means of the interheater zones indicated in Figure 1. In this operation an average reaction temperature designated by line 458 is maintained by periodically reheating the reacting vapor stream in the interheater zones shown in Figure 1 to raise the temperature of the vapor stream passing through the reaction zone. Thus, after the fluids have reached the average reaction temperature indicated by line 458, the fluids are reheated in the first interheater zone disposed between the first and second reaction zones. During passage through the second reaction zone the temperature decreases somewhat due to endothermic reactions of aromatization from a temperature slightly above the average reaction temperature designated at point 460 to a temperature slightly below the average designated at point 462. The vapors are then reheated in the second interheater zone established between the second and third reaction zones thereby returning the temperature somewhat above the average temperature. This intermediate reheating to raise the temperature and subsequent endothermic cooling during reaction is repeated throughout the subsequent reaction zones. The net effect is to establish a temperature profile wherein the temperature increases from the feed inlet temperature at point 464 to a peak temperature designated at 452 and in which the average temperature throughout the remainder of the reaction zone is maintained at a substantially isothermal average value indicated by line 458.

Curve 450 indicated in Figure 2 is the conventional temperature profile. The temperature profile indicated by curve 456 is that maintained in the specific example given above.

If desired, a rising average temperature gradient may be established corresponding to curve 466 in which the same temperature rise due to olefin hydrogenation exists between the inlet temperature at point 464 and a point along toward the end of the first reaction zone and following which the interheater zones are operated at a sufficiently high heat duty to overcompensate for the temperature drop associated with the endothermic aromatization reactions. Thus, the average reaction temperature designated by curve 466 continues to rise through the second, third, fourth, and fifth reaction zones.

This type of rising temperature gradient operation is especially desirable in operations where heavily aromatized gasoline blending stocks are the desired products or in which specific naphthenic reactor feed stocks are selected for the production of toluene or benzene and their alkylated homologues. This rising temperature successfully establishes and maintains high aromatization reaction rates throughout the reactor as the vapor becomes more and more thermally stable due to the accumulation of aromatic hydrocarbons produced during the reaction.

A specific means has been found which is unusually successful and simple for removing the reacting fluid from the reactor vessel at points between the adjacent reaction zones whereby the vapor is forced through the interheater zone and then returned at a higher temperature for passage through the subsequent reaction zone. This apparatus is shown in Figures 3 and 4.

Referring now to Figures 3 and 4, a portion of column 470 is shown provided with upper and lower adjacent transverse trays 472 and 474 respectively. These trays are parallel and fill the entire cross section of the column and are sealed against vapor flow at their edges against the inside column wall. Between the upper and lower trays is formed a vapor engaging zone 476 while below the lower tray is vapor disengaging zone 478. Outlet opening 480 for disengaging vapor connects with the interheater not shown and the reheated vapor passes back through inlet opening 482 into vapor engaging zone 476. The vapor thus engaged passes upwardly through bubble caps 484 arranged uniformly throughout the cross section of upper tray 472. Also indicated in Figure 4 are the square funnel-shaped members 490 which collect catalyst flowing through openings 486 and discharge it into sealing legs 488. The granular catalyst flows downwardly around bubble caps 484 and through plurality of openings 486 also distributed uniformly throughout the tray cross section. The catalyst then passes downwardly through at least one and preferably a plurality of sealing legs 488 constituting a sealing zone between the adjacent reaction zones and discharge to form a moving catalyst bed below disengaging zone 478. The sealing zone is adapted to permit downward flow of catalyst while restricting flow of vapor therethrough.

It is therefore apparent that two flow paths for the rising vapor are provided. One is a high resistance path upwardly through the relatively impermeable mass of granular catalyst in sealing legs 488 into the reaction zone above upper tray 472. The other is a low resistance path from disengaging zone 478 through outlet 480, through the interheater zone, back through inlet 482, and upwardly from engaging zone 476 through vapor risers 486 into the next reaction zone. A pressure drop of about 1.1 p. s. i. g. exists across the sealing legs forcing the major portion of the reacting fluids out through outlet 480 and through the interheater, not shown, and back into inlet 482 while a minor portion flows through the sealing legs into the next reaction zone generating the pressure differential required to cause vapor to flow through the interheater zones.

In the reforming apparatus of Figure 1, the sealing and vapor disengaging-engaging means contained 52 sealing legs with a 2-foot 3-inch tray spacing. The sealing legs are 4 feet 6 inches long and constructed of 4-inch O. D. 11 gauge tubing and uniformly distributed over the column cross section to permit uniform downflow of catalyst. This design permits a 10% flow of reacting vapor upwardly through the sealing legs while forcing the remaining 90% of vapor to flow around the sealing leg through the externally mounted interheaters.

It is preferable to have at least a major portion of vapor flowing through the interheaters and even more beneficial to flow 75-99% of the vapor therethrough. An 80-95% flow represents an optimum since a major flow through the interheater is permitted with sealing legs of reasonable length.

With particular reference to Figure 5, a detailed elevation view in cross section is shown of the granular solids conveyance-disengaging head, solids flow control means, and catalyst elutriation system employed in the recirculatory solids flow at a point above the catalyst regeneration zone. The upper extremity of spent catalyst conveyance conduit 40, also shown in Figure 1, is shown here. The granular solids discharge into flow reversing chamber 492 at a point between 0.1 and about 1.5 conduit outlet diameters below the upper closed surface of the reversing zone. If desired also, outlet member 494 may be provided with a smaller cross sectional area at point 496 than the area of conduit 40 and an outlet opening 497 which is elliptical in cross section or otherwise of restricted area.

The restricted outlet area and the proximity of upper surface 498 to outlet opening 497 establish a restriction or a thrust force against the discharge of granular solids thereby preventing fluidization of the spent catalyst in conveyance conduit 40 and maintaining the moving permeable continuous compact mass of catalyst in an unfluidized state at the same bulk density as catalyst flowing down through the reaction or regeneration columns.

Granular solids flow downwardly from reversing chamber 492 in compact unfluidized form concurrently with depressured conveyance fluid through transfer line 500 and into and through solids flow control valve superstructure 502. Pneumatically or electrically operated control valve headworks 504 is provided above the superstructure with a valve stem 506 extending downwardly through the headworks superstructure into a solids flow control and conveyance fluid disengaging chamber 508. A funnel-shaped member 510 is disposed in chamber 508 and through which the granular solids flow. Valve stem 506 also extends therethrough coaxially and terminates in valve plate 512 disposed adjacent outlet opening 514 of funnel 510. Thus operation of automatic valve headworks 504 effects the opening and closing as well as a solids flow throttling action at outlet opening 514 serving to maintain the solids above the opening in compact unfluidized form. If granular solids flow is stopped by closure of plate 512 against opening 514, the solids flow in conveyance conduit 40 also immediately stops since the compact granular solids are at their maximum density and there is no room for further compaction of the unfluidized solids mass.

Above funnel 510 in the upper part of chamber 508 is depressured conveyance fluid disengaging zone 516 with outlet opening conduit 518 provided for removal of at least part of the depressured conveyance fluid. The granular solids pass downwardly by gravity from chamber 508 through opening 514. They are then allowed to fall as a shower, in uncompacted form, through elutriation gas disengaging zone 520 and through elutriation zone 522.

Outlet 524, provided with a control valve not shown, opens from disengaging zone 520. A reduced pressure is maintained in disengaging zone 520 relative to the lower end of elutriation zone 522 thereby establishing and maintaining an upward flow of elutriation gas which comprises flue gas from the regeneration column and a downward flow of lift gas as a seal from zone 508. The velocity of this gas is controlled by throttling the flow through opening 524. Catalyst fines are effectively elutriated from the granular solids in elutriation zone 522 by the upward flue gas flow and are swept out in suspension through opening 524. This gas flow is controlled at a sufficient velocity to effect a suspension or fluidization of the catalyst fines, but insufficient to suspend and carry out the larger catalyst solids which are to be retained. Thus gas flow conditions are hereby maintained in elutriation zone 522 to separate continuously what small amount of catalyst fines are formed and prevent occurrence of the well-known deleterious effects of such fines in moving bed contacting processes.

Example II

The process of Example I is carried out with a rising temperature gradient rather than an isothermal gradient by employing the same conditions as in Example I, but wherein the heat duty of the interheater zones is increased to overcompensate for endothermic temperature drops in the reaction zones. The temperature at which the reactor feed is introduced is again 825° F. The temperature rapidly rises to 910° F. in the first reaction zone and decreases to 890° F. as the naphthene aromatization reactions begin. In the first interheater zone the temperature is increased to 920° F. and subsequently decreases to 900° F. during passage through the second reaction zone. In the third interheater zone the temperature is increased to 935° F., and the temperature is increased from 915° F. to 950° F. in the third interheater zone, and again increases from 940° F. to 965° F. in the fourth interheater zone. The reactor effluent is removed from the reactor column at a temperature of 950° F. and is handled in the same manner as described in Example I.

The gasoline products thus obtained have an increased aromatic content and are obtained in the same volumetric yields. The light gasoline product is produced at 11,000 B./D. having an API gravity of 59°. The aromatic content is 45% by volume, a 12.5% increase in aromatic formation over that obtained in Example I. The light gasoline product therefore constitutes an excellent high quality aromatic blending stock for internal combustion engine fuels or it may be subjected to fractionation procedures to recover substantially pure streams of relatively narrow boiling range aromatic solvents or to produce individual aromatic hydrocarbons in substantially pure form.

Example III

A naphthenic gasoline having an initial boiling point of 190° F. and a dry point of 290° F. is produced from Southern California oil fields containing substantial quantities of naphthene hydrocarbons including methyl cyclohexane, dimethyl cyclopentanes, and dimethyl cyclohexanes.

This naphtha feed is vaporized and brought into contact with a cobalt molybdate catalyst at 920° F. to produce toluene and xylenes during passage through the reaction zones according to the process of Example I. The interheaters are operated to maintain an isothermal temperature profile averaging 920° F. The catalyst-to-oil ratio employed in this operation is 0.14 and 90% liquid yield is obtained containing 25% toluene, 23% xylenes, and 3% ethyl benzene by volume.

Example IV

The same process as in Example III is carried out with a rising temperature gradient in which an inlet temperature of 900° F. is established and the reaction zone temperature is increased by means of the interheater zones referred to so that a maximum temperature at the inlet to the last reaction zone of 940° F. is attained. The liquid yield is 90% by volume and the product contains 29% toluene, 28% xylenes, and 4% ethyl benzene by volume.

Example V

A naphthenic gasoline having a boiling range of between 150° F. and 185° F. and rich in methyl cyclopentane and cyclohexane and containing $C_6$ paraffins is contacted with a cobalt molybdate catalyst according to this invention to produce benzene. The reactor feed preheat temperature is 910° F. and through the use of interheater zones a rising temperature gradient reaching a peak of 1,000° F. is established and maintained. The reactor effluent is removed at 990° F. and fractionated according to the procedures of Example I. The catalyst oil ratio is 0.14. The hydrogen recycle rate is 3000 M. S. C. F./B. of feed. The product produced contained 32% by volume benzene, the liquid yield obtained is 86% by volume.

Example VI

In a similar operation to that described in Example V the same naphthenic gasoline as feed stock is reacted under substantially the same conditions in the presence of mixed catalyst comprising a mixture of 25% by weight of granular silica-alumina cracking catalyst and 75% by weight of a supported cobalt molybdate catalyst. Catalyst-to-oil ratio is 0.14 and the hydrogen recycle rate was 3000 M. S. C. F./B. of feed. Substantially the same liquid yield is obtained as in the process of Example V, however, an increased aromatic content is noted in which paraffin isomerization in the presence of the silica-alumina cracking catalyst furnishes additional naphthenic hydrocarbons which are dehydrogenated. The liquid product containe 46% benzene, constituting a 44% increase in benzene formation.

In the process of Example VI, the other well-known isomerization catalysts may also be employed in amounts of from 5% to 50% by weight of total catalyst solids with the reforming and aromatization catalyst.

In the improved reforming process of the present invention, the preferred hydrocarbon feed stocks comprise petroleum naphthas, straight-run gasolines, low-grade cracked gasolines, various low octane sulfur- and nitrogen-containing hydrocarbons, and mixtures of these materials boiling roughly below about 500° F. An excellent feed stock is a mixture of straight-run and cracked gasolines. For toluene and xylenes synthesis, feed stocks are naphthas boiling between 175° F. and 325° F. and preferably between about 200° F. and 260° F. for toluene alone. For benzene synthesis, the feed naphtha has a boiling range between 110° F. and 200° F. and preferably is a naphthenic naphtha boiling within a range of from 165° F. to 185° F.

The reaction temperatures employed in this invention vary between outside limits of 700° F. and 1,100° F. Preferred temperatures for producing gasoline blending stock and for the production of toluenes and xylenes from narrow range naphthenic feeds are between 850° F. and 975° F. For the production of benzene from the various $C_6$ naphthene and paraffin hydrocarbons, the preferred temperature range is 900° F. to 1,050° F.

The reactor feed inlet temperature is determined by the quantity of olefins present in the feed stock. For straight-run feeds, the inlet temperature is preferably from 5° F. to 50° F. above the desired initial reaction temperature. For olefin-containing feed stocks, the inlet temperature is preferably sufficiently below the desired initial reaction temperature so that upon saturation of the olefinic constituents with hydrogen in the recycle gas, the heat released will raise the vapor temperature to approximately the desired initial reaction temperature.

The reaction pressures in the process of this invention are preferably superatmospheric, outside limits being between about 50 p. s. i. g. and 2,000 p. s. i. g. The preferred reaction pressures for gasoline improvement lie between about 250 p. s. i. g. and 800 p. s. i. g. For producing toluene and xylenes the preferred pressure range is 100 p. s. i. g. to 700 p. s. i. g. and for producing benzene the preferred pressure range is 50 p. s. i. g. to 500 p. s. i. g.

The recycle gas preferably contains a substantial proportion of hydrogen, above a minimum of about 60% being preferred. It is preferred also that the recycle gas be preheated to the same temperature as the reactor feed inlet temperature. One preferred modification is to introduce about half of the recycle gas at the same point in the reactor as the feed is introduced and to introduce the remaining part at a point below the feed inlet to effect hydrogen stripping of the spent catalyst.

The recycle gas rates are available from about 500 S. C. F./B. to as high as 10,000 S. C. F./B. Preferred recycle rates for the reforming processes illustrated herein lie between about 2,000 and 6,000 S. C. F./B.

The catalyst-to-oil weight ratio, as determined from the ratio of the weight flow rates of the catalyst and the naphtha feed respectively, are characteristically low in the process of this invention. For example, ratios of from as low as 0.02 to as high as 3.0 pounds of catalyst per pound of oil may be employed and the preferred ratios lie between about 0.20 and 1.50.

The liquid hourly space velocity (LHSV), in volumes of liquid feed per volume of catalyst in the reactor per hour, is preferably between about 0.2 and 2.0 being employed. Lower values such as from 0.2 to about 0.72 are desirable for cracked feeds, values of from about 0.75 to 1.25 being good with mixed cracked and straight-run feeds, and higher values than 1.25 being preferred for straight-run feeds.

The residence time of the catalyst in the reactor varies from about 2 to as high as 50 hours and preferably the residence time in the reactor is as high as catalyst activity permits. Generally a residence time of about 20 hours may be realized under the reaction condition given above. It is also preferred that this residence time be determined from the amount of hydrocarbonaceous material deposited on the spent catalyst and varied so that the spent catalyst contains not more than about 5% by weight of hydrocarbonaceous deactivating materials when removed from the reaction vessel.

The catalyst regeneration is preferably carried out at temperatures below 1,100° F., temperatures of 900 to 1,050° F. being preferred. The air content of the flue gas recycle regeneration gases is adjusted to control the maximum regeneration temperature, generally 1% or 2% of air being employed. The regeneration pressure is ordinarily somewhat lower than the reaction pressure and to a considerable extent depends upon the pressure differential existing across the spent catalyst conveyance zone. Ordinarily, the regeneration pressure will be between 25 and 100 p. s. i. g. below the reaction pressure.

Following catalyst regeneration, a catalyst reduction step is preferably effected by contacting the regenerated catalyst with a portion of the hydrogen-containing recycle gas. Ordinarily about 5,000 to 7,000 standard cubic feet per ton of cobalt molybdate catalyst is sufficient to bring the catalyst to its highest activity following regeneration.

The temperature control features of this invention, applied above to fluid-solids contacting processes in which the reactions have a net endothermic effect and temperature decreases result during the contact, may be modified to provide similar process advantages in those contacting processes wherein the reactions have a net exothermic effect normally resulting in temperature increases during the contact. Such processes are exemplified by the catalytic hydrodesulfurization of hydrocarbons contaminated with hydrocarbon compounds of sulfur, nitrogen, and oxygen. Such hydrocarbon fractions are separated from West Texas and California crude petroleums, shale oils, tar sand oils, coal tar oils, and the like. Often these oils are coked to produce a coker distillate having a lower boiling range and a reduced sulfur and nitrogen contamination. Valuable fuel and solvent stocks may be produced from such distillates or from the original hydrocarbons by catalytic desulfurization and denitrogenation in the presence of hydrogen and a catalyst.

The desulfurization and denitrogenation of the sulfur- and nitrogen-containing hydrocarbons with the catalyst are carried out in substantially the same manner as described above in the reforming of naphtha and as shown in Figure 1. The reactions have a net exothermic effect and the heat exchange between the individual reaction zones cools the reacting vapor rather than heating it as in reforming.

The operating conditions for such a process are as follows: temperature 650° F. to 900° F., pressure 500 p. s. i. g. to 2,500 p. s. i. g., recycle gas rate 500 to 10,000 S. C. F. per barrel containing between 60% and 90% of hydrogen by volume, liquid hourly space velocity (LHSV) 1.0 to 6.0, and a cobalt molybdate catalyst with a catalyst residence time of from 10 to as high as 500 hours in the reaction zones.

*Example VII*

The hydrodesulfurization of full range coker distillate boiling between 160° F. and 960° F. at a rate of 10,000 barrels per day is effected in an apparatus very similar to the reactor-regenerator vessel arrangement shown in Figure 1 and in which intercoolers are provided in the reaction vessel. The feed stock has an API gravity of 27.6°, analyzes 3.77% of sulfur and 0.27% of nitrogen by weight and is prepared from thermal coking of Santa Maria Valley (California) crude petroleum. The reaction vessel is 6 feet in diameter and 60 feet high with a 42-foot total catalyst bed depth. Three sealing and vapor engaging-disengaging zones are provided, at distances of 4 feet 6 inches, 8 feet 6 inches, and 15 feet from the feed inlet. Thus 4 reaction zones are provided having bed depths of 4 feet, 4 feet 6 inches, 6 feet 6 inches, and 27 feet respectively. The construction of the reactor vessel and of the sealing zones is shown in Figures 1, 3 and 4.

The feed and 5,000 S. C. F. per barrel of recycle gas are introduced at 1,100 p. s. i. g. into the reactor. Cobalt molybdate catalyst is circulated at a rate of 2,150 pounds per hour, the catalyst residence time thus being 30 hours. The liquid hourly space velocity is 2.0 and an average reaction temperature of 850° F. is maintained by the reaction zone intercoolers.

The reaction, when carried out adiabatically, has a temperature profile (temperatures in the reactor plotted as a function of distance from feed inlet) which rises 100° F. or more, for example, feed is introduced at 780° F. and the temperatures are 812° F., 839° F., 870° F., 882° F., and 887° F. at distances through the catalyst bed of 5, 10, 20, 30, and 40 feet from the feed inlet. Such operation causes excessive cracking with resultant loss of liquid yield and increased coke laydown, limits the maximum LHSV which may be employed and reduces product quality.

In the process of this invention using the intercoolers to effect temperature control, the feed is introduced at 836° F. and rises to 863° F. in the first reaction zone. The vapor is subsequently cooled to 836° F. in the first intercooler zone through which the major portion of the reacting fluid is passed while the minor portion passes through the sealing zone. The temperature rises to 862° F. in the second reaction zone, is cooled to 834° F. in the second intercooler, rises to 862° F. in the third reaction zone, is again cooled to 835° F. in the third intercooler, and rises to 862° F. in the fourth reaction zone from which it is removed, cooled, partially condensed, and fractionated for production of the recycle gas and the hydrodesulfurized and denitrogenated products. The intercooler duty is 4,500,000 B. t. u. per hour each and each intercooler is provided with a temperature recorder controller to control the degree of cooling.

The liquid products are recovered at a rate of 9,927 barrels per day. The gasoline fraction of the product, boiling up to 400° F., analyzes 0.03% sulfur and 0.011% nitrogen by weight, has an API gravity of 57.1°, and is produced at a rate of 2,800 barrels per day. The diesel fraction, boiling between 400° F. and about 700° F., analyzes 0.04% sulfur and 0.10% nitrogen by weight, has an API gravity of 33.1°, cetane number of 41, and is produced at a rate of 6,740 barrels per day. The residuum fraction, boiling over 700° F., analyzes 0.12% sulfur and 0.18% nitrogen by weight, has an API gravity of 25.1°, and is produced at a rate of 387 barrels per day. Gas production of $C_1$ to $C_3$ hydrocarbons amounts to 106.7 S. C. F. per barrel of feed and a net hydrogen consumption of 907 S. C. F. per barrel of feed occurs.

Thus, an average reaction temperature of 850° F. is established and maintained throughout the reaction zones whereby the liquid yield of better than 99% by volume is obtained, use of one reactor column instead of 3 or more is permitted eliminating the complex piping and value arrangements usually required and more efficient desulfurization and denitrogenation of feed stocks result.

The intercooling of other exothermic reactions carried out in a moving bed of contact material can be employed to secure the highly desirable results of maintaining the optimum reaction temperature throughout the plural reaction zones according to this invention, and while the above-described hydrodesulfurization and denitrogenation process is a preferred operation of this invention, it is also illustrative of the application of the intercooling technique of temperature control to exothermic solids-fluid contacting processes in general.

It should be understood that the process and apparatus of this invention may be carried out either with concurrent or countercurrent vapor and solids flow, although the latter type is preferred.

The vapor disengaging, heat exchange, and vapor engaging steps are here illustrated in connection with moving beds of solids with interheating in endothermic operations and with intercooling in exothermic operations. In some operations the solids do not require regeneration, as for example in the reforming of naphthas with certain platinum-containing catalysts and consequently a moving bed of such catalysts is not required. In fixed bed reforming operations with these catalysts similar undesirable temperature decreases occur. The provision of a reaction vessel such as that shown in Figure 1 having the sealing-engaging-disengaging trays of Figures 3 and 4 permits the maintenance of controlled isothermal or rising temperatures throughout a fixed bed of catalyst and a realization of the advantages discussed above. Similarly, such a reactor vessel may be used in fixed bed contacting operations where intercooling of reacting fluid is carried out to compensate for the temperature increases due to exothermic reactions.

Catalytic agents which accelerate the dehydrogenation, cyclization, desulfurization, denitrogenation, and other reactions occurring in the hydrocarbon conversion operations of this invention include oxides of vanadium, chromium, molybdenum, and tungsten used alone, or oxides of copper and chromium, chromium and molybdenum, and the like used together. The preferred catalyst is one containing cobalt molybdate either alone or supported on a carrier. The quantity of the catalytic agent in the finished catalyst normally is in the range from about 5% to 25% by weight and preferably in the range between about 7% and 12% although up to 100% of the catalytic agent may be used where no carriers are employed. The carrier may be any one of the known refractory oxides including silica, titania, alumina, thoria, zirconia, or mixtures thereof. Of particular merit and preferred in this process is a carrier of alumina containing about 5% silica in addition to the catalytic agent.

The preferred method for preparing the catalysts used in the present invention includes the steps of drying the carrier at 100° C., a calcination for about two hours at 600° C., impregnation of the carrier with a sodium-free aqueous solution containing a soluble compound of the active metal or metals, evaporation of the residual water from the drained carrier at 100° C., and a final calcination of 2 to 6 hours duration at 600° C. When a mixture of elements is employed, as in cobalt molybdate catalyst, two or more successive impregnation steps are employed each followed by a drying and a calcination step.

Applied to catalytic reforming, these catalysts effect isomerization, hydrogenation, hydrocracking, desulfurization, denitrogenation, and aromatization reactions at temperatures between about 700° F. and 1,050° F. When sulfur-bearing stocks are treated, a molybdenum oxide catalyst forms metal sulfides on the catalyst. These sulfides are converted to sulfur dioxide on regeneration. The other catalysts named reduce the sulfur of the feed to hydrogen sulfide which is produced with the hydrocarbon product. The process of this invention utilizes each of these catalysts with little modification and the advantageous results are experienced when the isothermal or rising temperature gradients are established as described in the reaction zone.

While any of the foregoing catalysts may be employed in the process of this invention, it has been found that catalysts of the cobalt molybdate type are extremely effective for carrying out the reforming, aromatization, desulfurization, and denitrogenation reactions of the process and are therefore the preferred catalysts. Cobalt molybdate type catalysts are extremely resistant to sulfur and nitrogen poisoning and at the same time possess the necessary physical ruggedness to permit their use in a moving bed type operation. Furthermore, the hydrogenation rate in the presence of a cobalt molybdate catalyst is extremely rapid and the naphthene aromatization rate is high with the result that extremely fine temperature control can be attained by the reaction zone interheating steps according to the methods of this invention, such as is not so readily obtainable with the aforementioned catalysts.

Cobalt molybdate catalysts in general comprise mixtures of cobalt and molybdenum oxides wherein the molecular ratio of $CoO$ to $MoO_3$ is between about 0.4 and 5.0 and are prepared as described below. This catalyst may be employed in unsupported form or alternatively it may be distended on a suitable carrier such as alumina, silica, zirconia, thoria, magnesia, magnesium hydroxide, titania, or any combination thereof. Of the foregoing carriers it has been found that the preferred carrier material is alumina and especially alumina containing about 3—8% by weight of silica.

In the preparation of the unsupported cobalt molybdate, the catalyst can be coprecipitated by mixing aqueous solutions of, for example, cobalt nitrate and ammonium molybdate, whereby a precipitate is formed. The precipitate is filtered, washed, dried, and finally activated by heating to about 500° C.

Alternatively, the cobalt molybdate may be supported on alumina by coprecipitating a mixture of cobalt, aluminum, and molybdenum oxides. A suitable hydrogel of the three components can be prepared by adding an ammoniacal ammonium molybdate solution to an aqueous solution of cobalt and aluminum nitrates. The precipitate which results is washed, dried, and activated.

In still another method, a washed aluminum hydrogel is suspended in an aqueous solution of cobalt nitrate and an ammoniacal solution of ammonium molybdate is added thereto. By this means a cobalt molybdate gel is precipitated on the alumina gel carrier.

Catalyst preparations similar in nature to these and which can also be employed in this invention have been described in U. S. Patents 2,369,432 and 2,325,033.

Still other methods of catalyst preparation may be employed such as by impregnating a dried carrier material, e. g. an alumina-silica gel, with an ammoniacal solution of cobalt nitrate and ammonium molybdate. Preparations of this type of cobalt molybdate catalyst are described in U. S. Patent 2,486,361.

In another method for preparing impregnated cobalt molybdate catalyst, the carrier material may be first impregnated with an aqueous solution of cobalt nitrate and thereafter impregnated with an ammoniacal molybdate. Alternatively, the carrier may also be impregnated with these solutions in reverse order. Following the impregnation of the carrier by either of the foregoing methods the material is drained, dried, and finally activated in substantially the same manner as is employed for the other catalysts.

In the preparation of impregnated catalysts where separate solutions of cobalt and molybdenum are employed, it has been found that it is preferable to impregnate the carrier first with molybdenum, e. g., ammoniacal ammonium molybdate, and thereafter to impregnate with cobalt, e. g., aqueous cobalt nitrate, rather than in reverse order.

In another method for the preparation of suitable catalyst, a gel of cobalt molybdate can be prepared as described hereinbefore for the unsupported catalyst. The gel after drying and grinding can be mixed with a ground alumina, alumina-silica, or other suitable carrier together with a suitable pilling lubricant or binder. The mixture can then be pilled or otherwise formed into pills or larger particles and activated.

In another modification, finely divided or ground molybdic oxide can be mixed with suitably ground carrier such as alumina, alumina-silica, and the like in the presence of a suitable lubricant or binder and thereafter pilled or otherwise formed into larger agglomerated particles. These pills or particles are then subjected to a preliminary activation by heating to 600° C., for example, and are thereafter impregnated with an aqueous solution of cobalt nitrate to deposit the cobalt compound thereon. After draining and drying, the particles are heated to about 600° C. to form the catalyst.

It is apparent from the foregoing description of the different types of cobalt molybdate catalyst which may be employed in this invention that we may employ either an unsupported catalyst, in which case the active agents approximate 100% of the composition, or we may employ a supported catalyst wherein the active agents, cobalt and molybdenum oxides, will generally comprise from about 7 to 22% by weight of the catalyst composition. In all of the foregoing catalytic preparations it is desirable to maintain the molecular ratio of cobalt oxide as $CoO$ to molybdic oxide as $MoO_3$ between about 0.4 and 5.0.

A particular embodiment of the present invention has been described in considerable detail by way of illustration. It should be understood that various other modification and adaptation thereof may be maintained by those skilled in the particular art without departing from the spirit and scope of this invention as set forth in the appended claims.

We claim:

1. A process for the catalytic reforming of low anti-knock rating naphthas which comprises providing a plurality of superimposed catalytic reforming zones and an elongated sealing zone of restricted cross section adapted to the flow of catalyst while restricting the flow of vapor therethrough interposed between adjacent reforming zones, passing a moving bed of compact unfluidized reforming catalyst downwardly by gravity successively through said reforming and sealing zones at a catalyst to naphtha ratio of between about 0.2 and about 1.50 pounds per pound, passing a countercurrent flow of naphtha vapor and between about 2000 S. C. F. and about 6000 S. C. F. of a hydrogen-containing recycle gas per barrel of naphtha as a reactant vapor at a temperature of between about 850° F. and about 950° F. and a pressure of between about 250 p. s. i. g. and about 800 p. s. i. g. upwardly successively through said reforming zones in each of which a temperature decrease occurs due to endothermic aromatization and reforming reactions taking place therein, passing a minor portion of the thus cooled reactant vapor from all but the uppermost of said plurality of reforming zones through the next superjacent sealing zone into the next superjacent reforming zone thereby establishing and maintaining a pressure differential therein sufficient to force a major portion of said cooled reactant vapor from each of the same reforming zones into and through an interheater zone external to said reforming zone, reheating said major portion of reactant vapor in said interheater zone out of contact with said reforming catalyst to at least fully compensate for the temperature decrease occurring in the reforming zone from which said major portion was removed, flowing the reheated major portion under the influence of said pressure differential into contact with the reforming catalyst in the next superjacent reforming zone for admixture with said minor portion and subsequent passage of the combined reheated reactant vapor stream through said next superjacent reforming zone, removing the reacted vapor stream from the uppermost of said plurality of reforming zones as a reactor effluent, cooling and partially condensing said effluent, separating the condensed phase from the uncondensed phase of said effluent, fractionating the condensed phase to produce reformed aromatic hydrocarbon-containing high anti-knock naphtha stream of desired boiling range, separating a substantial proportion of the hydrocarbons as a gas product from said uncondensed phase leaving said hydrogen-containing recycle gas, and recirculating at least a part of said recycle gas for passage with further quantities of said low anti-knock rating naphtha through said reforming zones.

2. A process according to claim 1 in combination with the steps of flowing spent reforming catalyst from the lowermost of said reforming zones through a spent catalyst stripping zone, stripping residual naphtha from said spent catalyst with a countercurrent stream of said recycle gas containing hydrogen passing through said spent catalyst stripping zone into said lowermost reforming zone, subsequently stripping any remaining naphtha from said catalyst by a flow of steam, maintaining a uniform flow of catalyst downwardly through said reforming zones throughout the entire cross-sectional area thereof, conveying said stripped spent catalyst through a spent catalyst conveyance zone by means of a depressuring flow of steam, applying a thrust force against the mass of catalyst discharging therefrom to maintain catalyst during conveyance as a dense mass having substantially the same density as the static bulk density of said catalyst when at rest, passing the thus conveyed catalyst as a shower through an elutriation zone countercurrent to an upflow of elutriation gas, controlling the velocity of said elutriation gas to suspend and carry away catalyst fines from said shower, subsequently contacting the elutriated spent catalyst as a moving compact unfluidized bed in a regeneration zone with a recirculated stream of flue gas containing oxygen to burn hydrocarbonaceous deactivating deposits from said spent catalyst forming a regenerated reforming catalyst, maintaining a uniform flow of catalyst throughout the cross-sectional area of said regeneration zone, passing regenerated catalyst through a solid catalyst pressuring zone into an induction zone, injecting into said induction zone a conveyance gas at a pressure greater than that maintained in said reforming zones, depressuring said gas concurrently with said regenerated catalyst through a regenerated catalyst conveyance zone, applying a force against the dense mass of catalyst discharging therefrom thereby maintaining the catalyst during conveyance as a dense mass having substantially the same density as the static bulk density of the catalyst when at rest, passing the thus conveyed regenerated catalyst through a catalyst reducing zone, contacting the catalyst therein with a stream of said hydrogen-containing recycle gas to raise the reforming activity thereof to a maximum, and passing the thus treated catalyst into the uppermost of said reforming zones for passage downwardly therethrough to contact further quantities of said low anti-knock rating naphtha and hydrogen.

3. A process according to claim 2 in combination with the steps for purification of said hydrogen-containing recycle gas which comprises countercurrently contacting a substantially degassed cool lean portion of said condensed phase of reactor effluent with said uncondensed phase in a recycle gas enrichment absorption zone forming a rich oil phase containing absorbed hydrocarbon constituents of said uncondensed phase leaving said hydrogen-containing recycle gas unabsorbed, subsequently combining said rich oil phase with said condensed phase, countercurrently contacting the resulting liquid in the absence of added heat with a recompressed hydrogen- and hydrocarbon-containing first flash zone gas to form a rectified oil phase, flashing said rectified oil into a first flash zone without added heat forming said first flash zone gas and a first flashed oil phase, fractionating part of said first flashed oil phase to produce hydrocarbon fractions thereof of different boiling range, reflashing the remaining part of said first flashed oil phase to near atmospheric pressure without added heat to produce said substantially degassed lean portion of said reactor effluent, recirculating said lean portion to said recycle gas enrichment absorption zone, passing one part of said recycle gas into said spent catalyst recycle gas stripping zone, another part into said regenerated catalyst reduction zone, and another part into said lowermost reforming zone with said low anti-knock rating naphtha.

4. A process according to claim 3 wherein said low anti-knock rating naphtha comprises olefin hydrocarbon-containing cracked gasoline contaminated with hydrocarbon compounds of sulfur and nitrogen and boiling below about 500° F., in combination with the step of vaporizing and preheating said naphtha vapor to a temperature below the desired reforming temperature by an amount substantially equal to the temperature rise effected in the first reforming zone by the exothermic hydrogenation of the olefin hydrocarbons through reaction with said hydrogen-containing recycle gas.

5. A process according to claim 4 wherein said moving bed of catalyst solids comprises between about 5% and about 50% by weight of a hydrocarbon isomerization catalyst and between about 50% and about 95% by weight of said reforming catalyst comprising cobalt molybdate.

6. A method of obtaining improved temperature control in a solids-fluid contacting process in which a fluid reactant is passed through a bed of compact unfluidized solids in a contacting zone in which undesirable temperature changes in the fluid reactant occur due to the thermal nature of the chemical reactions taking place, which method comprises passing a moving bed of solid granular contact material downwardly by gravity successively through a plurality of superimposed alternate reaction and sealing zones within said contacting zone, said sealing zones having relatively small cross sections and relatively long lengths and being interposed between adjacent reaction zones and adapted to permit the downward passage of said moving bed of solids and to restrict the flow of fluids therethrough, passing a flow of said fluid through said contacting zone successively through each of said reaction zones wherein said undesirable temperature change occurs whereby a minor portion of said fluid flows from the vapor outlet end of each of said reaction zones through the adjacent sealing zone into the adjacent reaction zone thereby establishing and maintaining a pressure differential between the adjacent reaction zones sufficient to force a major portion of said fluid from the vapor outlet end of the same reaction zone through a heat exchange zone external to said contacting zone, at least partly compensating within said heating zone and out of contact with said solids for the said temperature change occurring in the reaction zone from which said major portion of fluid was removed, subsequently flowing the thus treated major portion under the influence of said pressure differential into the fluid inlet end of said adjacent reaction zone for passage therethrough in contact with the catalyst and in admixture with said minor portion, removing the reacted fluid from the last of said plurality of reaction zones as a contacting zone effluent, and controlling the degree of heat exchange in each of said heat exchange zones to maintain a desired temperature profile throughout said contacting zone.

7. An improved process for the enrichment of hydrogen-containing recycle gases employed in catalytic hydrocarbon conversion reactions effected in the presence of hydrogen which comprises flowing converted hydrocarbons and hydrogen from a conversion zone as a reactor effluent, cooling and partially condensing said reactor effluent forming a condensed phase and an uncondensed phase, countercurrently contacting a substantially degassed lean cool portion of said condensed phase of reactor effluent with said uncondensed phase in a recycle gas enrichment absorption zone forming a rich oil phase containing absorbed hydrocarbon constituents of said uncondensed phase leaving said hydrogen-containing recycle gas unabsorbed, subsequently combining said rich oil phase with said condensed phase, countercurrently contacting the resulting liquid with a recompressed hydrogen- and hydrocarbon-containing first flash zone gas in the absence of heating to form a rectified oil phase containing reduced quantities of absorbed hydrogen, flashing said rectified oil into a first flash zone without heating forming said first flash zone gas and a first flashed oil phase, fractionating part of said first flashed oil phase to produce hydrocarbon fractions of different boiling range, reflashing the remaining part of said first flashed oil phase to near atmospheric pressure without adding heat to produce said substantially degassed lean portion of said reactor effluent, and recirculating said lean portion to said recycle gas enrichment absorption zone.

8. In a process for catalytic conversion of hydrocarbons in which a vapor containing hydrocarbons to be converted is passed in direct contact with a downwardly moving bed of solid granular catalyst under conversion conditions of pressure and temperature through a conversion zone wherein undesirable temperature changes occur due to the nature of conversion reactions taking place, the improvement in the temperature control of the conversion zone which comprises providing a plurality of separate reaction zones in said conversion zone with a sealing zone disposed between adjacent reaction zones, said sealing zones having restricted cross sections and extended lengths and adapted to contain a bed of catalyst and restrict the flow of vapor therethrough, passing a stream of hydrocarbons to be converted successively through said plurality of separate reaction zones in which temperature changes of the reacting vapor occur whereby a minor portion of this reacting vapor from a given reaction zone passes through the catalyst bed in the adjacent sealing zone into the adjacent reaction zone thereby generating a pressure differential sufficient to force the major portion of reacting vapor to flow directly from the same reaction zone through a heat exchange zone out of contact with said catalyst, wherein at least partial compensation is made for said temperature change and then said major portion flows into contact with the catalyst in said adjacent reaction zone for admixture with said minor portion and passage of the combined stream therethrough, removing reacted vapor from the last of said plurality of reaction zones as a reaction effluent, and recovering desirable products therefrom.

9. A process according to claim 8 wherein said conversion reactions are endothermic causing a temperature decrease in the direction of hydrocarbon vapor flow and wherein said heat exchange zones are heating zones in which the temperature of vapor passed therethrough is raised.

10. A process according to claim 8 wherein said conversion reactions are exothermic causing a temperature increase in the direction of hydrocarbon vapor flow and wherein said heat exchange zones are cooling zones in which the temperature of vapor passed therethrough is decreased.

11. In a process for catalytic reforming and aromatization of hydrocarbons in which a vapor containing hydrocarbons to be reformed is passed in the presence of a hydrogen-containing recycle gas in direct contact with a compact unfluidized bed of reforming and aromatization catalyst at a pressure between about 50 and 2,000 p. s. i. g. and a temperature between about 700° F. and 1,100° F. through a contacting zone wherein the temperature of the vapor decreases in the direction of flow due to the endothermic nature of the reforming and aromatization reactions taking place, the improvement which comprises maintaining throughout said contacting zone a substantially isothermal average temperature profile by the steps of providing in said conversion zone a plurality of superimposed separate reforming zones with an elongated sealing zone of restricted cross section adapted to the flow of catalyst while restricting the flow of vapor therethrough disposed between adjacent reforming zones, passing a moving bed of substantially compact unfluidized hydrocarbon reforming catalyst downwardly by gravity successively through said reforming and sealing zones, flowing a stream of vaporized hydrocarbon to be reformed and a hydrogen-containing recycle gas successively through said reaction zones in each of which the temperature of the vapor flowing therethrough decreases to a value below the desired average reforming temperature, passing a minor portion of this reforming vapor from a given reforming zone through the sealing zone into the reforming zone immediately adjacent thereto thereby generating a pressure differential which forces the major portion of the reforming vapor from the same reforming zone through an interheater zone external to said reforming zone, reheating the vapor passing through said interheater zone out of contact with said reforming catalyst to a temperature above said desired average reforming temperature, the temperature increase thus effected being substantially equal to said temperature decrease in the reforming zone from which said major portion was removed, flowing the reheated major portion of reforming vapor under the influence of said pressure differential back into contact with the reforming catalyst in said immediately adjacent reforming zone for passage therethrough in admixture with the unreheated minor portion thereby maintaining a substantially uniform average temperature in each of said plurality of reforming zones, removing reformed vapor from the last reforming zone, cooling and partially condensing said vapor, separating reformed liquid products from the condensate, separating a hydrogen-rich gas from the uncondensed portion, and recirculating at least part thereof as said hydrogen-containing recycle gas.

12. In a process for catalytic reforming and aromatization of hydrocarbons in which a vapor containing hydrocarbons to be reformed is passed in the presence of a hydrogen-containing recycle gas in direct contact with a reforming and aromatization catalyst at a pressure between about 50 and 2,000 p. s. i. g. and a temperature between about 700° F. and 1,100° F. through a contacting zone wherein the temperature of the vapor decreases due to the endothermic nature of the reforming and aromatization reactions taking place, the improvement which comprises maintaining throughout said conversion zone an average reforming temperature which increases in said contacting zone in the direction of vapor flow by the steps of providing in said conversion zone a plurality of superimposed separate reforming zones with an elongated sealing zone of restricted cross section adapted to the flow of catalyst while restricting the flow of vapor therethrough disposed between adjacent reforming zones, passing a moving bed of substantially compact unfluidized hydrocarbon reforming catalyst downwardly by gravity successively through said reforming and sealing zones, flowing a stream of vaporized hydrocarbon to be reformed and a hydrogen-containing recycle gas successively through said reaction zones in each of which the temperature of the vapor flowing therethrough decreases to a value below the desired average reforming temperature, passing a minor portion of this reforming vapor from a given reforming zone through a sealing zone into the reforming zone immediately adjacent thereto thereby generating a pressure differential sufficient to force the major portion of the reforming vapor from the same reforming zone through an interheater zone external to said reforming zone, reheating the vapor passing therethrough while out of contact with said reforming catalyst to a temperature above said desired average reforming temperature, the temperature increase thus effected being greater than said temperature decrease in the reforming zone from which said major portion was removed, flowing the reheated major portion of said reforming vapor under the influence of said pressure differential back into contact with the catalyst in said immediately adjacent reforming zone for passage therethrough in admixture with the unreheated minor portion thereby maintaining a higher average reforming temperature in each successive reforming zone and a temperature profile which increases in the direction of vapor flow through said contacting zone, removing reformed vapor from the last reforming zone, cooling and partially condensing said vapor, separating reformed liquid products from the condensate, separating a hydrogen-rich gas from the uncondensed portion, and recirculating at least part thereof as said hydrogen-containing recycle gas.

13. In a process for catalytic desulfurization of hydrocarbons contaminated with hydrocarbon compounds of sulfur in which a vapor containing hydrocarbons to be desulfurized is passed in the presence of a hydrogen-containing recycle gas in direct contact with a desulfurization catalyst at a pressure between about 500 p. s. i. g. and 2,500 p. s. i. g. and a temperature between about 650° F. and 900° F. through a contacting zone wherein the temperature of the vapor increases due to the exothermic nature of the process reactions taking place, the improvement which comprises maintaining throughout said contacting zone a substantially isothermal average temperature profile by the steps of providing in said conversion zone a plurality of superimposed separate desulfurizing zones with an elongated sealing zone of restricted cross section adapted to the flow of catalyst while restricting the flow of vapor therethrough disposed between adjacent desulfurizing zones, passing a moving bed of substantially compact unfluidized hydrocarbon desulfurizing catalyst downwardly by gravity successively through said desulfurizing and sealing zones, flowing a stream of vaporized hydrocarbon to be desulfurized and a hydrogen-containing recycle gas successively through said reaction zones in which the temperature of the vapor flowing therethrough increases to a value above the desired average desulfurizing temperature, passing a minor portion of this desulfurizing vapor from a given desulfurizing zone through the sealing zone into the desulfurizing zone immediately adjacent thereto thereby generating a pressure differential therein sufficient to force the major portion of the desulfurizing vapor from the same desulfurizing zone through an intercooler zone external to said desulfurizing zones, cooling the vapor passing therethrough out of contact with said catalyst to a temperature below the said desired average desulfurization temperature, the temperature decrease effected thereby being substantially equal to said temperature increase in the desulfurizing zone from which said major portion was removed, flowing the cooled major portion of desulfurizing vapor under the influence of said pressure differential back into contact with the desulfurization catalyst in said immediately adjacent desulfurizing zone for passage therethrough in admixture with the uncooled minor portion thereby maintaining a substantially uniform average temperature in each of said plurality of desulfurizing zones, removing desulfurized vapor from the last desulfurizing zone, cooling and partially condensing said vapor, separating desulfurized liquid products from the condensate, separating a hydrogen-rich gas from the uncondensed portion, and recirculating at least part thereof as said hydrogen-containing recycle gas.

14. A process for the reforming and aromatization of hydrocarbon naphthas for the synthesis of toluene and xylenes which comprises providing a plurality of superimposed reforming zones and an elongated sealing zone of restricted cross section adapted to the flow of catalyst while restricting the flow of vapor therethrough interposed between adjacent reforming zones, passing a moving bed of compact unfluidized reforming catalyst downwardly by gravity successively through said reforming and sealing zones, passing a countercurrent flow of naphtha having a boiling range of between about 175° F. and about 325° F. and a flow of hydrogen-containing recycle gas at a rate of between about 2000 S. C. F. and 6000 S. C. F. per barrel of said naphtha successively through said reforming zones at an average reforming temperature therein of between about 850° F. and 975° F. and at a pressure between about 100 and 700 p. s. i. g. and wherein a temperature decrease occurs in said reforming zones due to the endothermic aromatization and reforming reactions taking place, passing a minor portion of the thus cooled reactant vapor from all but the uppermost of said plurality of reforming zones through the superjacent sealing zone into the superjacent reforming zone thereby establishing and maintaining a pressure differential therebetween sufficient to force a major portion of said cooled reactant vapor from each of said reforming zones directly through an interheater zone external to said reforming zone, reheating said major portion in said interheater zone out of contact with said catalyst to at least fully compensate for the temperature decrease occurring in the reforming zone from which said major portion was removed to maintain a substantially isothermal average reforming temperature in all of said plurality of reforming zones, flowing the reheated major portion under the influence of said pressure differential into contact with the catalyst in the next superjacent reforming zone for admixture with said minor portion and subsequent passage of the combined reactant vapor stream through said superjacent reforming zone, removing the reacted vapor stream from the uppermost of said plurality of reforming zones as a reactor effluent, cooling and partially condensing said effluent, separating the condensed phase from the uncondensed phase of said effluent, fractionating the condensed phase to produce liquid product streams rich in toluene and the isomeric xylenes, separating a substantial proportion of the hydrocarbons from said uncondensed phase leaving said hydrogen-containing recycle gas, and recirculating at least a part of said recycle gas for passage with further quantities of said naphtha through said reforming zones.

15. A process for the reforming and aromatization of hydrocarbon naphthas for the synthesis of benzene which comprises providing a plurality of superimposed reforming zones and an elongated sealing zone of restricted cross section adapted to the flow of catalyst while restricting the flow of vapor therethrough interposed between adjacent reforming zones, passing a moving bed of compact unfluidized reforming catalyst downwardly by gravity successively through said reforming and sealing zones, passing a countercurrent flow of naphtha having a boiling range of from about 110° F. to about 200° F. and a flow of hydrogen-containing recycle gas at a rate of between about 2000 S. C. F. and about 6000 S. C. F. per barrel of naphtha successively through said reforming zones at an average reforming temperature therein of between about 900° F. and about 1050° F. and at a pressure between about 50 p. s. i. g. and about 500 p. s. i. g. and wherein each of said reforming zones a temperature decrease occurs due to the endothermic aromatization and reforming reactions taking place, passing a minor portion of the thus cooled reactant vapor from all but the uppermost of said plurality of reforming zones through the superjacent sealing zone into the superjacent reforming zone thereby establishing and maintaining a pressure differential therebetween sufficient to force a major portion of said cooled reactant vapor from each of the same reforming zones directly through an interheater zone external to said reforming zone, reheating said major portion in said interheater zone out of contact with said catalyst to at least fully compensate for the temperature decrease occurring in the reforming zone from which said major portion was removed to maintain a substantially isothermal average reforming temperature in all of said plurality of reforming zones, flowing the reheated major portion under the influence of said pressure differential into contact with the catalyst in the superjacent reforming zone and into admixture with said minor portion and subsequent passage of the combined reactant vapor stream through said next superjacent reforming zone, removing the reacted vapor stream from the uppermost of said plurality of reforming zones as a reactor effluent, cooling and partially condensing said effluent, separating the condensed phase from the uncondensed phase of said effluent, fractionating the condensed phase to produce a liquid product stream rich in benzene, separating a substantial proportion of the hydrocarbons from said uncondensed phase leaving said hydrogen-containing recycle gas, and recirculating at least a part of said recycle gas for passage with further quantities of said naphtha through said reforming zones.

16. An apparatus for effecting controlled temperature conversion of hydrocarbons in the presence of a moving bed of granular solid catalyst which comprises an elongated vertically disposed reaction vessel, an elongated vertically disposed catalyst regeneration vessel, a regenerated catalyst conveyance and sealing conduit communicating the bottom of said regeneration vessel with the top of said reaction vessel, a spent catalyst conveyance conduit communicating the bottom of said reaction vessel with an elevated solids-fluid separation chamber, an inlet conduit for conveyance fluid and an outlet conduit for conveyance fluid communicating with the bottom and the top of each of said conveyance conduits respectively, separate means adjacent the outlet end of each of said conduits for applying a thrust force to solids discharging therefrom to maintain the moving solids therein at a bulk density substantially equal to the static bulk density of said solid catalyst when at rest, an elutriation chamber in solids-delivering relation to the top of said regeneration vessel, a conduit for said solids communicating said separator chamber with the top of said elutriation chamber, an inlet conduit for an elutriation gas opening into the bottom thereof, an outlet conduit for said elutriation gas and suspended fine solids opening from the top of said elutriation chamber, an inlet conduit for an oxygen-containing gas opening into said regeneration vessel, an outlet conduit for flue gas opening therefrom, separate inlet and outlet conduits for hydrocarbon vapor communicating with the ends of said reaction vessel, sealing and interheating means for controlling the temperature throughout said reaction vessel, said last-named means comprising at least one pair of parallel upper and lower transverse trays spaced apart from each other and each sealed against solids and fluid flow at their peripheries against the inner wall of said reaction vessel, at least one vapor riser opening through said upper tray, at least one vertically disposed elongated sealing leg conduit open at both ends and having its upper opening at the top of said upper tray and its lower opening at a point below said lower tray, at least one indirect heat exchanger supported externally to said reaction column for each pair of parallel transverse trays and communicating through separate conduits with said reaction columns at points above and below said lower transverse tray, said sealing and interheating means being adapted to generate a pressure differential due to a flow through said sealing leg of a minor portion of the reacting vapor sufficient to force the major portion of said vapor through a flow path external to said reaction column and including said indirect heat exchanger, a temperature detecting and control instrument associated with each of said heat exchangers and adapted to detect the temperature of the vapor, and means responsive thereto adapted to control the degree of temperature change in said major portion of vapor effected during passage thereof through each of said heat exchangers whereby a desired temperature profile is maintained throughout said reactor vessel.

17. An apparatus for effecting controlled temperature hydrocarbon conversion processes in the presence of a moving bed of granular solid catalyst which comprises an elongated vertically disposed reaction vessel adapted to the downward passage by gravity of a compact unfluidized moving bed of granular catalyst therethrough, an inlet conduit adjacent one end of said vessel for hydrocarbons to be treated, an outlet conduit adjacent the other end of said vessel for hydrocarbon reactor effluent, at least one inlet conduit for regenerated catalyst opening into the top of said vessel, an outlet conduit opening from the bottom thereof for spent catalyst, an induction chamber communicating with said last-named outlet conduit, a conduit for fluids opening into said induction chamber, a plurality of parallel conveyance-regeneration conduits having their lower inlet openings disposed at a point adjacent the bottom of said induction chamber and their outlet openings communicating with the said inlet conduit for regenerated catalyst at the top of said reaction vessel, means for applying a thrust force to the catalyst discharging from said conveyance-regenerator conduits whereby the catalyst during regeneration and conveyance therethrough is maintained at a bulk density substantially equal to the static bulk density of said solid catalyst when at rest, an outlet conduit for fluids communicating with the upper ends of said conveyance-regeneration conduits, an elongated stack surrounding said conveyance-regeneration conduits, inlet and outlet conduits for a cooling fluid communicating with said stack, at least one sealing and heat exchange means disposed along the height of said reactor column between said inlet and outlet conduits for hydrocarbons and adapted to control the reaction temperature therein, said last-named means comprising at least one pair of parallel upper and lower transverse trays each sealed against fluid and solids flow at their peripheries against the inner wall of said reaction vessel, at least one vapor riser opening through said upper tray, at least one vertical elongated sealing leg conduit open at both ends and having its upper end at the top of said upper tray and its lower end below said lower tray, an indirect heat exchanger associated with each of said sealing and heat exchange means and supported externally to said reaction vessel and communicating through separate conduits with the space below said lower tray and with the space between said trays, said sealing leg being adapted to generate a pressure differential due to a flow through a bed of solids therein of a minor portion of the reacting vapor sufficient to force the major portion of said vapor through the external flow path including said heat exchanger, and a temperature detecting and control instrument associated with each of said heat exchanger means adapted to control the degree of temperature change in said major portion of vapor effected during passage thereof through said heat exchanger.

18. An apparatus for contacting fluids with a compact unfluidized bed of solid granular contact material which comprises a vertically disposed closed elongated pressure resistant vessel having an inlet and an outlet for solids, an inlet conduit for a fluid to be contacted opening into said vessel at a point adjacent one end thereof, an outlet conduit for a fluid opening from said vessel at a point adjacent the other end thereof, at least one fluid sealing and heat exchange means disposed along the length of said vessel between its upper and lower ends; said fluid sealing and heat exchange means comprising a pair of adjacent parallel horizontally disposed trays filling the cross-sectional area of said vessel and sealed at their peripheries against the inner wall of said vessel to prevent fluid flow, a plurality of vapor risers and caps disposed on said upper tray, a plurality of vertical sealing leg tubes open at their upper and lower ends and filled with a compact mass of unfluidized contact material to provide a high resistance flow path therethrough for fluids being contacted and extending from the top of the upper tray down through said lower tray to a point therebelow thereby providing an empty fluid disengaging space on one side of said lower tray and around said tubes and an empty fluid engaging space on the other side of said lower tray and around said tubes, an outlet conduit for fluids opening through the vessel wall from said disengaging space, an inlet conduit for fluids opening through the vessel wall into the fluid engaging space, a heat exchanger connected to said last-named inlet and outlet conduits providing a low resistance path for fluids in parallel with said high resistance path through said sealing leg tubes; and a temperature sensitive controller instrument connected to detect the temperature of fluid and control the flow of heat exchange fluid flowing through said heat exchanger.

19. A sealing and fluid disengaging-engaging apparatus adapted to the removal for intermediate external treatment and subsequent reintroduction of treated fluids from and into, respectively, closely adjacent points along the length of a fluids-solids contacting vessel through which said fluids are flowing in direct contact with a compact unfluidized mass of granular solid contact material which comprises a pair of adjacent parallel transverse trays filling the cross-sectional area of said vessel and sealed at their peripheries against the inner wall of said vessel to prevent fluid flow, a plurality of vapor risers and caps disposed on said upper tray providing a path for the flow of fluids therethrough, a plurality of vertical sealing leg tubes open at their upper and lower ends and extending from the top of said upper tray down through said lower tray to a point therebelow, and a first conduit for fluids communicating with said contacting vessel between said trays, a second conduit for fluids communicating with said contacting vessel below said lower tray, said first and second conduits communicating indirectly with each other through a low resistance path for said fluids and external to said vessel in parallel with the high resistance flow path through said sealing leg tubes whereby a major portion of said fluids flow through said low resistance path for external treatment under the influence of a pressure differential generated by the flow of a minor portion of said fluids through said high resistance path provided by said sealing legs.

References Cited in the file of this patent

UNITED STATES PATENTS

| | | |
|---|---|---|
| 2,273,299 | Szayna | Feb. 17, 1942 |
| 2,311,318 | Tyson et al. | Feb. 16, 1943 |
| 2,322,366 | Kassel | June 22, 1943 |

(Other references on following page)

UNITED STATES PATENTS

| | | |
|---|---|---|
| 2,322,863 | Marschner et al. | June 29, 1943 |
| 2,347,682 | Gunness | May 2, 1944 |
| 2,374,109 | Layng et al. | Apr. 17, 1945 |
| 2,418,673 | Sinclair et al. | Apr. 8, 1947 |
| 2,423,813 | Lechthaler et al. | July 8, 1947 |
| 2,429,359 | Kassel | Oct. 21, 1947 |
| 2,432,745 | Gary | Dec. 16, 1947 |
| 2,434,843 | Fahnestock et al. | Jan. 20, 1948 |
| 2,469,329 | Crowley | May 3, 1949 |
| 2,494,337 | Hemminger | Jan. 10, 1950 |
| 2,499,304 | Evans | Feb. 28, 1950 |
| 2,508,993 | Crowley | May 23, 1950 |
| 2,656,306 | Bergstrom et al. | Oct. 20, 1953 |
| 2,658,859 | Dart | Nov. 10, 1953 |
| 2,684,873 | Berg | July 27, 1954 |